United States Patent [19]

Teranishi et al.

[11] Patent Number: 4,878,176
[45] Date of Patent: Oct. 31, 1989

[54] PRODUCTION PROCESS CONTROL SYSTEM

[75] Inventors: Mitsuji Teranishi; Yasuo Watanabe; Akira Takeuchi, all of Osaka, Japan

[73] Assignee: ASICS Corporation, Kobe, Japan

[21] Appl. No.: 171,226

[22] Filed: Mar. 22, 1988

Related U.S. Application Data

[63] Continuation of Ser. No. 730,185, May 3, 1985, abandoned.

[30] Foreign Application Priority Data

| May 4, 1984 | [JP] | Japan | 59-89831 |
| May 4, 1984 | [JP] | Japan | 59-89832 |
| May 4, 1984 | [JP] | Japan | 59-89833 |
| May 4, 1984 | [JP] | Japan | 59-65805[U] |
| May 4, 1984 | [JP] | Japan | 59-89835 |
| May 4, 1984 | [JP] | Japan | 59-89836 |
| May 4, 1984 | [JP] | Japan | 59-89837 |
| May 4, 1984 | [JP] | Japan | 59-65803 |
| May 4, 1984 | [JP] | Japan | 59-65804[U] |
| May 4, 1986 | [JP] | Japan | 59-89834 |

[51] Int. Cl.$^4$ ............................................. G06F 1/00
[52] U.S. Cl. ................................ 364/468; 364/478; 235/472; 340/709
[58] Field of Search .................. 364/468, 469, 478; 235/472; 340/707, 709

[56] References Cited

U.S. PATENT DOCUMENTS

| 3,351,912 | 11/1967 | Collum | 364/468 |
| 4,408,291 | 10/1983 | Gunzberg | 364/468 |
| 4,446,456 | 5/1984 | Beier | 340/706 |
| 4,501,931 | 2/1985 | Ohya | 340/709 |
| 4,561,060 | 12/1985 | Hemond | 364/478 |
| 4,682,261 | 7/1987 | Benson et al. | 364/468 |

FOREIGN PATENT DOCUMENTS

| 0094800 | 11/1983 | European Pat. Off. | 364/468 |
| 51128430 | 8/1948 | Japan . | |
| 5049491 | 7/1955 | Japan . | |
| 5724655 | 7/1955 | Japan . | |
| 0041938 | 4/1978 | Japan | 340/707 |

OTHER PUBLICATIONS

IBM Technical Disclosure Bulletin, R. W. Farr et al, *Dynamically Optimized Polling System,* vol. 20, No. 2, July, 1977.
Palm 3; User's Guide; 10/11/82; U.S. Patent and Trademark Office.
PALM 3; Worksteps; 4-83 and 10-83; U.S. Patent and Trademark Office.
PALM 3; Printouts; 4-30-84; U.S. Patent and Trademark Office.

*Primary Examiner*—Allen MacDonald
*Attorney, Agent, or Firm*—Lowe, Price, LeBlanc, Becker & Shur

[57] ABSTRACT

A production process control system comprising a plurality of terminal devices and a central device connected to the terminal devices, each of the terminal devices at least including means for counting the amount of work done (i.e. output), means for entering a worker identifying code and means for transmitting the counted output and the entered worker identifying code to the central device, the central device at least having means for performing communications with each terminal device and means for storing the output and the worker identifying code transmitted from the terminal device as associated with each other.

34 Claims, 32 Drawing Sheets

FIG.10
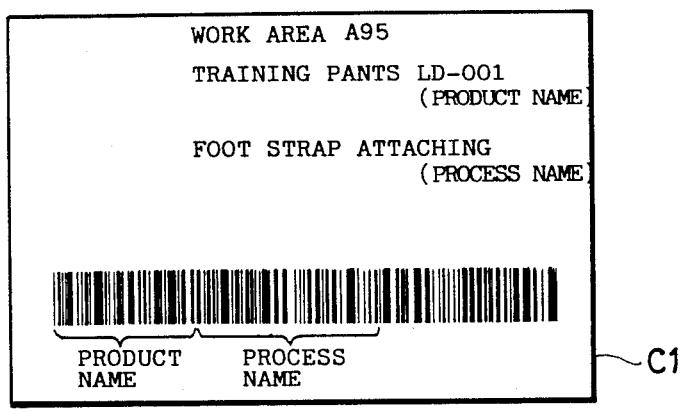
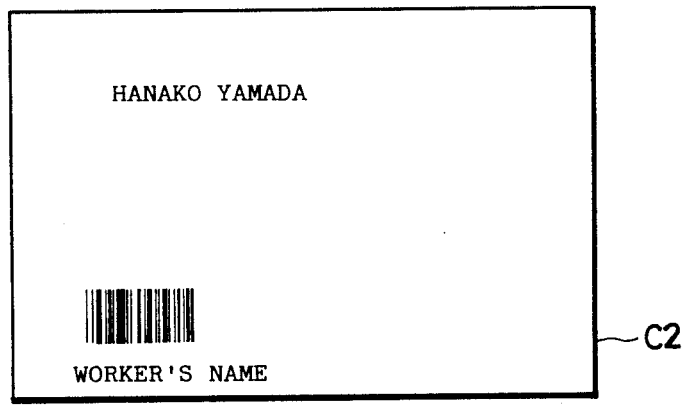

FIG.16

| AREA CODE | NAME OF WORKER | NAME OF PROCESS | NAME OF PRODUCT |
|---|---|---|---|
| A1 | | HANGING | LD-001 |
| A2 | | LINE ATTACHING | LD-001 |
| A3 | | NAME ATTACHING | LD-001 |
| A4 | | | |
| A5 | | | |
| A6 | | | |
| A7 | | | |

FIG. 17

| | STATE FLAG | PRODUCT NAME CODE | PROCESS CODE | WORKER NAME CODE | OUTPUT 10:00 (8:15~) | 12:00 (10:00~) | 15:00 (12:00~) | 16:45 (15:00~) | OVERTIME (16:45~) | ACTUAL PITCH TIME | STANDARD PITCH TIME | ACTUAL WORK TIME |
|---|---|---|---|---|---|---|---|---|---|---|---|---|
| WORK AREA A1 | | | | | | | | | | | | |
| WORK AREA A2 | | | | | | | | | | | | |
| | | | | | | | | | | | | |
| WORK AREA A128 | | | | | | | | | | | | |

FIG. 22

OUTPUT BY PRODUCTS, PROCESSES, WORKERS

PRODUCT:LD-001    PROCESS:LINE ATTACHING    OUTPUT:98,000

| | | | |
|---|---|---|---|
| 1 SUZUKI | 1,000 | 11 | |
| 2 SATO | 89,000 | 12 | |
| 3 TANAKA | 7,000 | . | |
| . | | . | |
| . | | . | |
| . | | . | |
| . | | . | |
| . | | . | |
| . | | 19 | |
| 10 | | 20 | |

FIG.24

PRODUCT: LD-260

PROCESS OUTPUT WITH TIME

| WORK AREA | PROCESS | WORKER | 10:00 | 12:00 | | 15:00 | | 16:45 | | OVERTIME | | ACTUAL PITCH TIME | THEORETICAL OUTPUT | EXCESS OR DEFICIT | REMARKS |
|---|---|---|---|---|---|---|---|---|---|---|---|---|---|---|---|
| | | | OUTPUT | OUTPUT | TOTAL | OUTPUT | TOTAL | OUTPUT | TOTAL | OUTPUT | TOTAL | | | | |
| A14 | FASTENER ATTACHING | YAMAMOTO | 20 | 35 | 55 | 40 | 95 | 45 | 140 | 0 | 140 | 2.50 | 160 | −20 | |
| A16 | FASTENER ATTACHING | YAMANAKA | 20 | 30 | 50 | 35 | 85 | 40 | 125 | 20 | 145 | | | −15 | |
| A18 | FASTNER ATTACHING | YAMADA | 30 | 35 | 65 | 45 | 110 | 55 | 165 | 0 | 165 | | | + 5 | |
| | TOTAL | | 70 | 100 | 170 | 120 | 290 | 140 | 430 | 20 | 450 | | 480 | −30 | |

FIG. 28

PROCESS LINE BALANCE CHECK

PRODUCT: LD-001

PROCESS: LINE ATTACHING

| FINAL PROCESS REFERENCE OUTPUT | 80 (PER HOUR) |
| --- | --- |
| THEORETICAL OUTPUT OF LINE ATTACHING PROCESS | 65 (PER HOUR) |
| BALANCE FACTOR | 81.2 (%) NG |

FIG.30

WORKER DAILY REPORT  83/11/13

| WORKER'S NAME | PRODUCT | PROCESS | OUTPUT | STANDARD PITCH TIME | STANDARD WORKING HOURS | ACTUAL WORKING HOURS | PROFICIENCY (%) |
|---|---|---|---|---|---|---|---|
| SUZUKI | LD-160 | DOUBLE SEWING | 200 | 0.6 | 120 | 155 | 77 |
| | | TACKING | 100 | 0.5 | 50 | 155 | 32 |
| | | LINE ATTACHING | 50 | 0.4 | 20 | 155 | 12 |
| TOTAL | | | 350 | — | 190 | 465 | AVERAGE 40 |
| SATO | LD-160 | | | | | | |

FIG. 31

| WORKER'S NAME | DATE/PROFICIENCY | | | |
|---|---|---|---|---|
| | 1983/10/10 30 | 1983/10/11 45 | 1983/10/12 62 | 1983/10/13 63 |
| SUZUKI | | | | |
| SATO | | | | |
| TANAKA | | | | |

PRODUCTION PROCESS CONTROL SYSTEM

This application is a continuation of application Ser. No. 730,185, filed May 3, 1985, now abandoned.

TECHNICAL FIELD

The present invention relates to a production process control system suited to a production operation which involves multiplicities of processes, work areas and workers for controlling the amount of work done as classified by the processes, works areas and workers.

BACKGROUND OF THE INVENTION

Typical of factory automation is a system which comprises the combination of conveyor system and robot system. With such a system, a multiplicity of workplaces are provided along the conveyor line, and each workplace is provided with a robot for performing the work for the process assigned to the workplace. The parts or articles to be processed are transported by the conveyor at a specified speed to be worked on as specified by robots at various workplaces and progressively made into finished products. Such an automated system is suitable for a product to be made by a plurality of processes for which approximately equal periods of time can be set to execute the contemplated work, or to a product for which processes can be set with assignment of approximately equal periods of working time. When workers are used instead of robots, each process may be such that, on the average, different persons can perform the contemplated work with approximately equal periods of time.

However, there are various kinds of products which are difficult to make by such typical factory automation, for example, a product which is manufactured by a series of processes including processes wherein the work efficiency is dependent largely on the ability of the worker, and a product which involves difficulty in assigning approximately equal working periods to the processes therefor. Stitched products are examples of such products.

In the case of any product, however, the improvement of productivity, which is one of the important goals, requires proper recognition and analysis of the flow of material through the production process. Further, since the overall efficiency depends on the capability and proficiency of the workers it is also important to recognize and analyze the productivity of the individual workers.

Where such typical factory automation is difficult to apply, difficulties are also encountered in obtaining at one location the data relating to the amount of work done as classified by workplaces (work areas) or processes, because the time required for work or work efficiency differs from process to process, and the material to be worked on therefore does not flow at a constant speed from process to process. In some cases, workers may change for personal reasons or to assure a balance between processes in the amount of work done, or some workers may be located at other work sites. Thus, it is also difficult to obtain data as to the amount of work done by each worker.

DISCLOSURE OF THE INVENTION

The main object of the present invention is to provide a production process control system which is suited for controlling the amount of work done as classified by processes, work areas and workers.

The production process control system comprises a plurality of terminal devices and a central device connected to the terminal devices, each of the terminal devices at least including means for counting the amount of work done (i.e. output), means for entering a worker identifying code and means for transmitting the counted output and the entered worker identifying code to the central device. The central device at least has means for performing communications with each terminal device and means for storing the output and the worker identifying code transmitted from the terminal device as associated with each other.

Since each terminal device has output counting means and worker identifying code entering means, and since each output and each identifying code are transmitted to the central device, it is possible for the central device to recognize the output of each worker. The worker identifying code is entered by each terminal device, so that the operator at the central device need not enter a change of worker to the central device every time such a change occurs.

Preferably, a terminal device is provided at each work area where a worker performs work. The central device sets a process as associated with the work area or terminal device, and stores the output and the worker identifying code transmitted from the terminal, as associated with the set process and the work area or terminal device. This makes it possible for the central device to control the output of each process or work area, in addition to the recognition of the output of each worker. This further permits the control of line balance.

If it is possible for one terminal device to handle a plurality of work areas and the identifying codes and outputs of a plurality of workers, the terminal device of course need not be provided for every work area. Conversely, one process can be set for a plurality of work areas or a plurality of terminal devices. An arrangement of ten numerical keys, card reader and various other means is usable as the means for entering the worker identifying code.

Various features of the invention will become apparent from the following description of an embodiment for producing stitched articles, with reference to the accompanying drawings.

BRIEF DESCRIPTION OF THE DRAWINGS

FIG. 10 is a plan view showing a product name-process name card and a worker name card;

FIG. 16 shows an example of a display on a CRT in process setting;

FIG. 17 shows part of a base data area in a data memory in the central device;

FIG. 22 shows an example of a CRT image for displaying output by workers;

FIG. 24 shows an example of data relating to process output with time, as printed out by a printer;

FIGS. 28 and 29 show examples of images to be shown on the CRT in line balance check processing;

FIG. 30 shows an example of worker daily report printed out by a printer in worker daily report output processing;

FIG. 31 shows a proficiency data storing area provided within the memory of the central device;

DESCRIPTION OF THE PREFERRED EMBODIMENT

Figure 1:
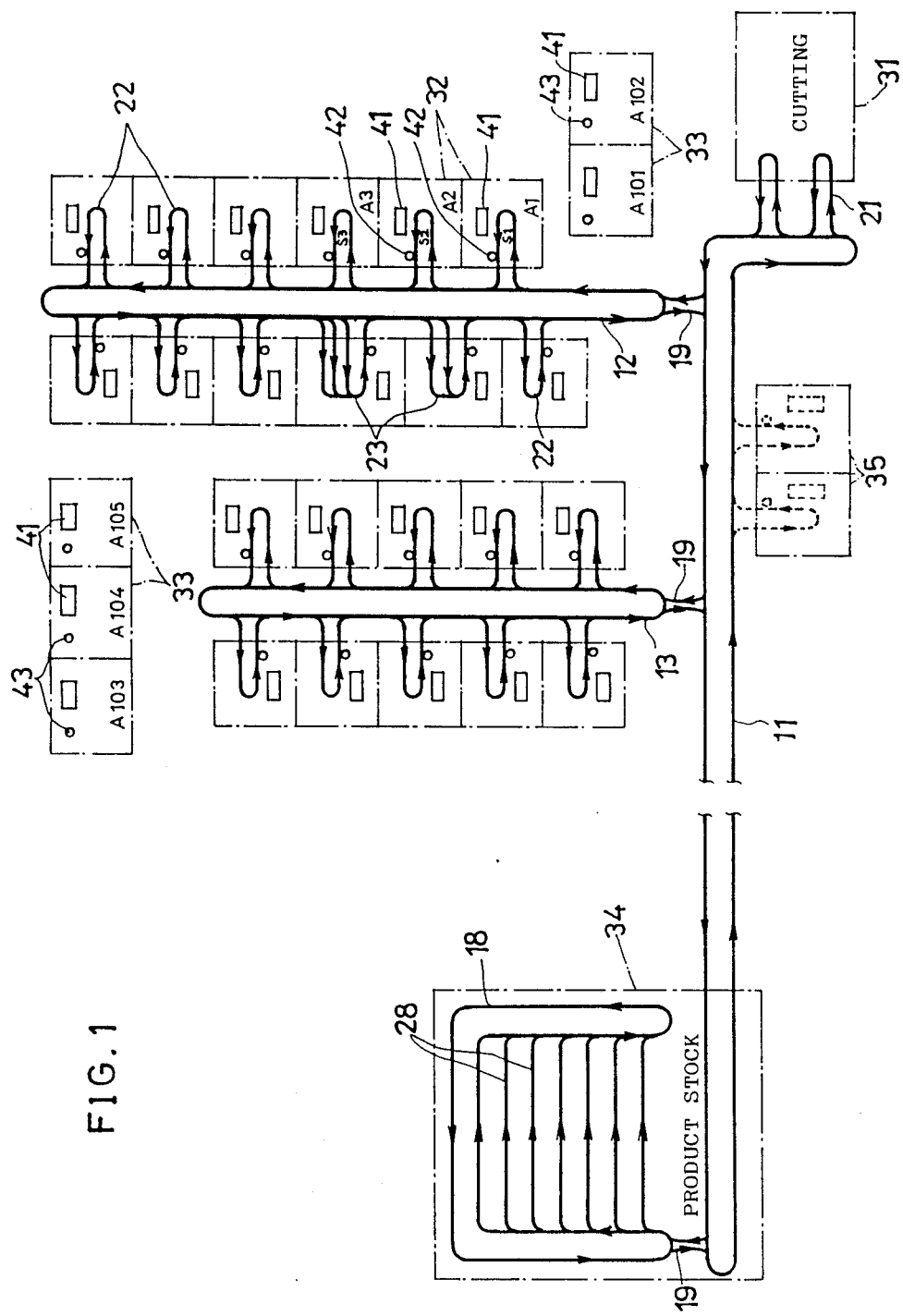
FIG. 1 schematically shows a conveyor system installed within a sewing factory.
Figure 2:
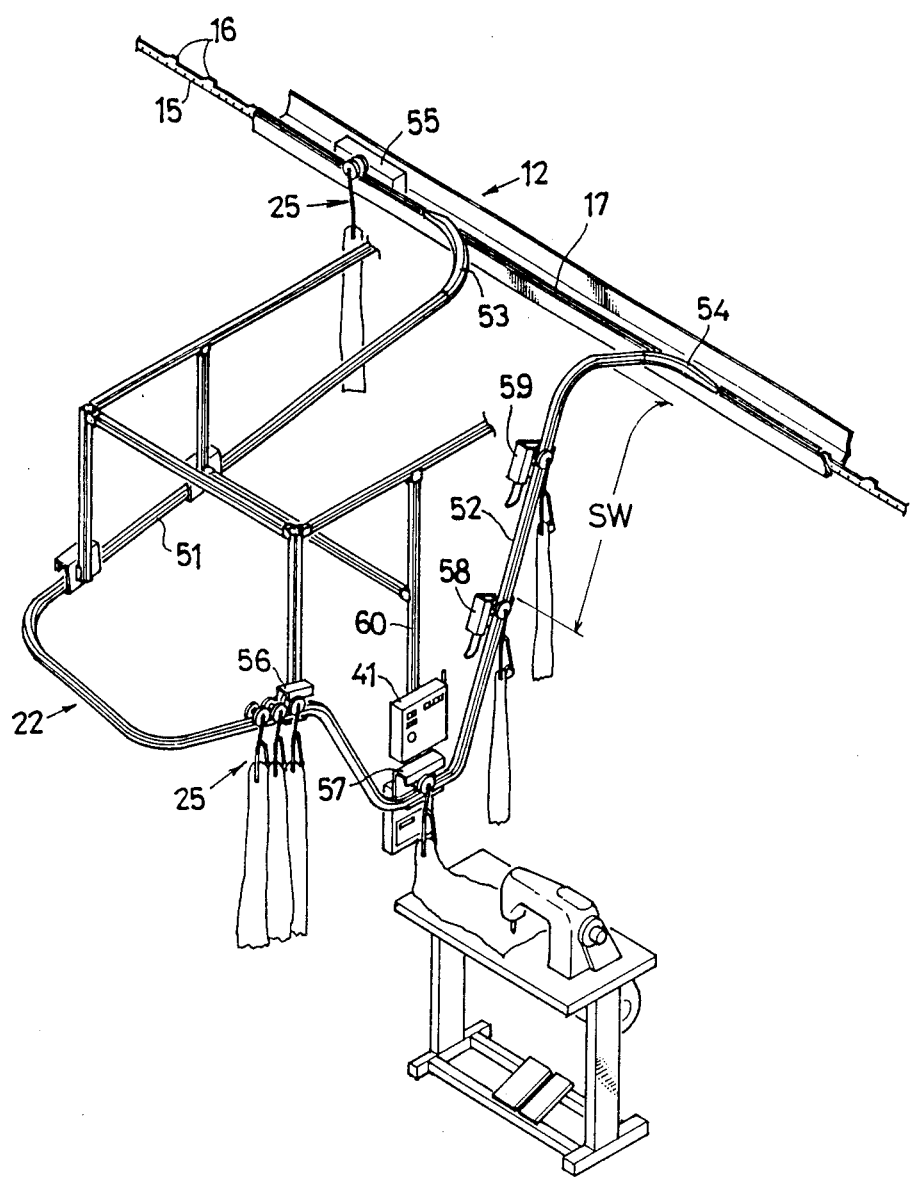
FIG. 2 is a perspective view showing a conveyor branch.
Figure 3:
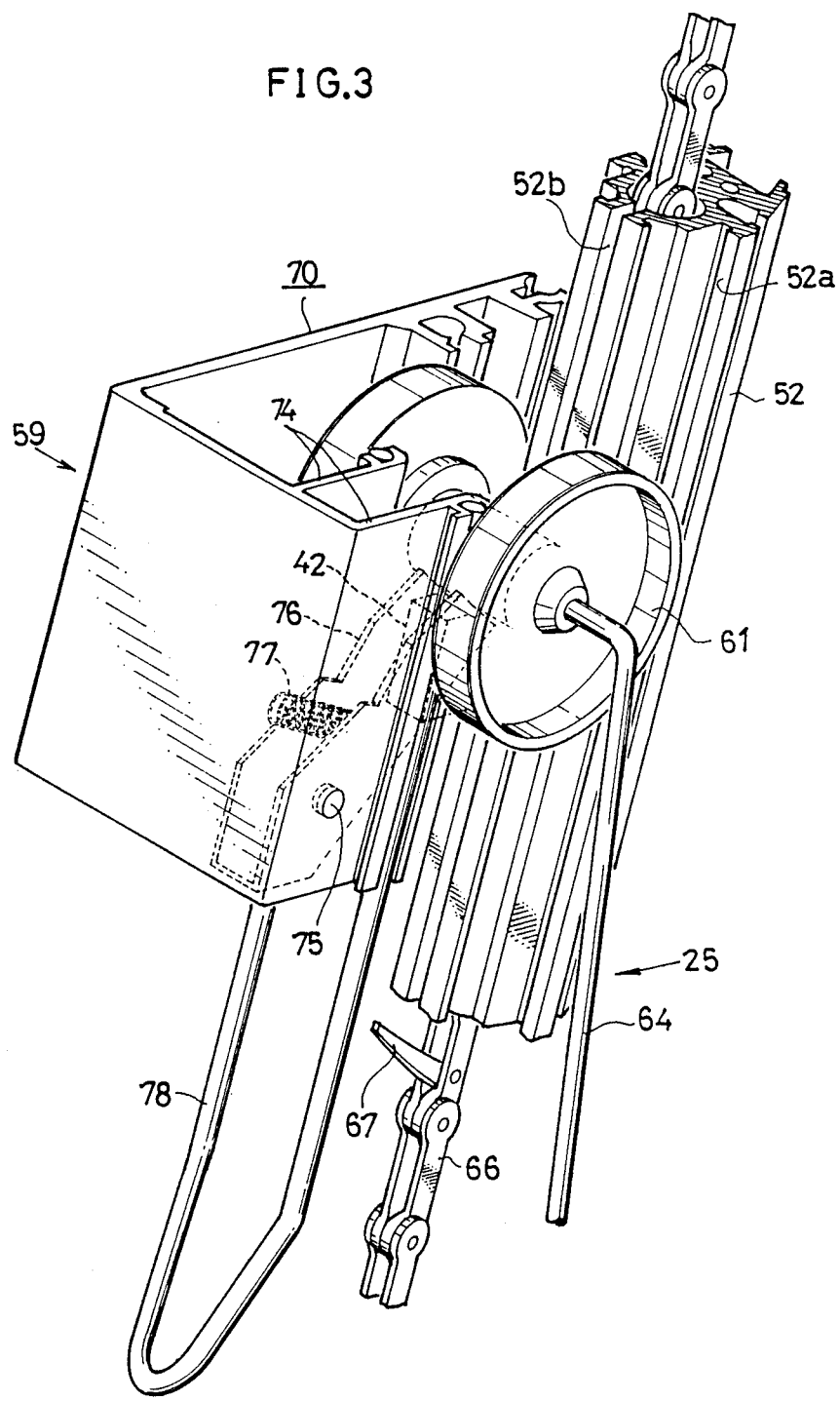
FIG. 3 is an enlarged perspective view showing an outgoing rail of the conveyor branch and a temporary stopping device for carriers.
Figure 4:
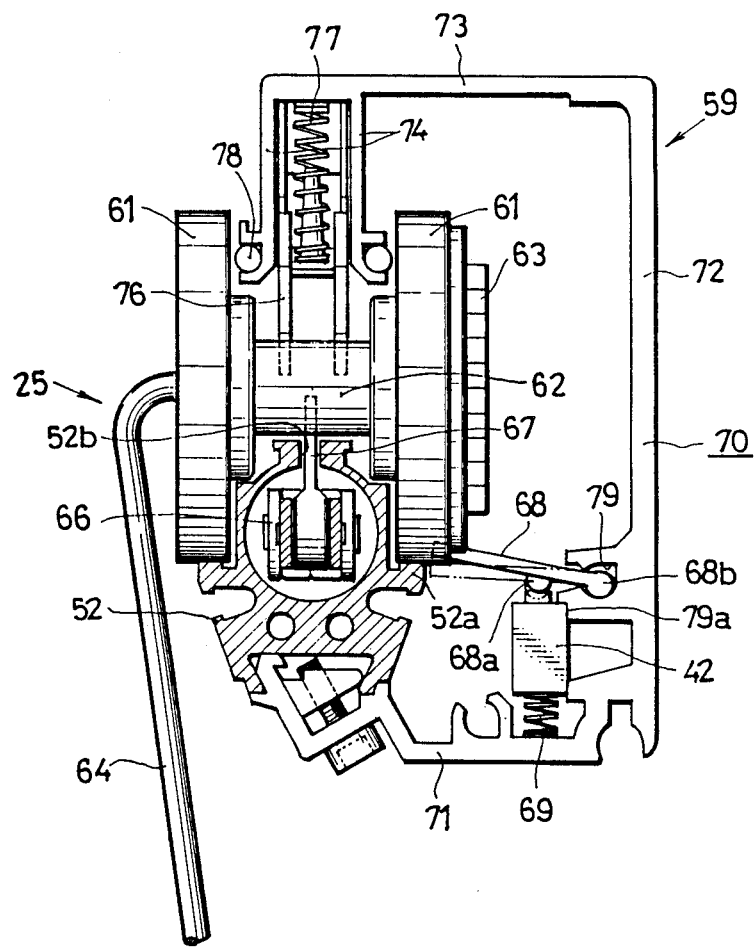
FIG. 4 is a partial vertical sectional view of a stopping device.

The Conveyor System:

FIG. 1 shows a conveyor system installed in a sewing factory. The conveyor, which is of the overhead type, is shown in detail in Published Examined Japanese Patent Application SHO No. 52-1193. The conveyor system includes some endless main lines 11, 12, 13, etc., which are connected together by connecting lines 19. As shown in FIGS. 2 to 4, carriers 25 have wheels 61 which are rollable on a rail 17 constituting the main line. The main line rail 17 is internally provided with a drive belt 15 coextensive therewith and having engaging portions 16 at a predetermined spacing. The carrier 25 is movable along the main line by being pushed by the engaging portion 16 on the belt 15 which is driven at a constant speed at all times.

The main lines 12 and 13 have connected thereto a multiplicity of branch lines 22 at suitable locations. The branch lines 22 have stations S1, S2, S3, . . . for articles to be transported, i.e. products, or parts or semi-finished products to be stitched. Sewing operation is conducted at these stations. There is also a station 23 having a plurality of supply branch lines 23 for supplying a plurality of parts to the station so that the plurality of parts are sewed together into a segment of product or a semi-finished product.

The main item of data to be controlled by the sewing process control system is the amount of work done. The amount of work done, which will be referred to as "output," is the number of segments of products, semi-finished products, products or the like. The output of each individual worker is called "individual output," the output of each processs is the "process output," and an output classified. according to the kind of product is the "product output." Further, the degree of variation of a process output is called a "line balance." Since the output is thus analyzed from several viewpoints, an identification code is necessary for discriminating different outputs from one another.

The number assignment to identify each work area, i.e. a workplace, is used as an output identification code. (The number will hereinafter be referred to as an "area code.") A work area 32 is provided for each station on the conveyor branch line 22. There are also work areas 33 which are provided at locations other than the conveyor branches. A work area 33 is a place where a fabric is worked on for a small part, such as pocket or the like. Not only the main lines 12 and 13, but also the main line 11 may,be provided with branch lines as indicated by broken lines in the Figures. These branch lines are also provided with work areas 35. Such work areas 32, 33 and 35 are assigned respective area codes A1, A2, A, . . . , A101, A102, . . . , which are different from one another.

It appears possible to assign, for example, to a sewing machine table, other work table or conveyor branch station, an output identification code other than the area code. However, it is likely that the worktable will be moved along with the worker or for a change of process, so that the code is not fully useful as an unchanged identification code. Further, the station, which belongs to the conveyor system, is provided only for a branch line. There is no station for the work area 33 which is irrelevant to the branch line. With use of codes assigned to stations, it becomes impossible to control the output of a process which is irrelevant to the conveyor system. Because the work areas can be fixedly predetermined within the sewing factory, the work area codes are useful as identification codes which are most suited to the sewing process control. The process control encounters no problem whatever even if the process is so designed that no work is performed at a certain work area.

With reference to FIG. 1, the work areas 32, 33 and 35 are each provided with a terminal device 41 for controlling the process concerned. The branch lines 22 are provided with switches 42 at the work areas 32 for counting the output automatically. When a part or the like is worked on at the work area 32 or 35 and sent to the main line via the branch line 22, the switch 42 is turned on. The work area 33 which is irrelevant to the conveyor branch line 22 is also provided with an output counting switch 43. The switch 43, which is a manual one, is turned on by the worker at the area 33 when one unit of the parts or the like has been worked on. The switch 43 may be one which is actuated by the worker's foot. The output signal from switches 42 and 43 is used for the terminal device 41 to count the number of worked parts or the like (output). The switch 43 at the work area 33 need not be actuated for every working operation but may be manipulated every time a number of parts or pieces have been worked on (e.g, for an output of 10 pieces). Alternatively, the switch 43 may be one, such as an arrangement of ten numerical keys, for directly entering numerical data, i.e., an output during a specified period of time.

FIG. 2 shows an example of conveyor branch line 22. The branch line 22 comprises an incoming rail portion 51 for guiding the carrier 25 from the rail 17 of the main line 12 to the station, and an outgoing rail portion 52 for returning the carrier 25 from the station to the main rail 17. As seen in FIG. 4, the carrier 25 comprises an axle 62, wheels 61 rotatably mounted on opposite ends of the axle 62, a hanger 64 extending downward from the axle 62 for holding at its lower end the article to be transported, such as a part, semifinished product or product, and an address portion 63 fixed to the axle 62 outside one of the wheels 61. The address portion 63 serves to store the code of the destination station (work area) for the carrier. The code can be changed as desired. Although a magnetic record medium is usable for the address portion 63, the address portion is preferably a mechanical means, such as one which comprises a plurality of movable small pieces.

With reference to FIG. 2, at the location where the incoming rail 51 branches off the main rail 17, the starting end of the rail 51 is provided with a pivotally movable arm 53. At a location upstream from the branching portion with respect to the direction of advance of the carrier 25, the main rail 17 is provided at one side thereof with an address sensor 55 for detecting the address expressed on the address portion 63. When the address indicates the station to which the branching rail 51 extends, the pivotal arm 53 is moved into contact with the rail 17, permitting an advancing carrier 25 to pass over the arm 53 onto the incoming rail 51. While rollingly advancing on the rail 51 under gravity, the carrier 25 is stopped by a temporary stopping device 56 which is disposed on an intermediate portion of the rail 51. If the address on the carrier 25 indicates other station, the pivotal arm 53 is held away from the rail 17, permitting the carrier 25 to continue its uninterrupted advance on the main rail 17.

An address setting device 57 is provided at the junction (where the station is located) between the incoming rail portion and the outgoing rail portion 52. The address of the station to which the carrier 25 is to be forwarded next is set on the address portion 63 of the carrier 25 by the device 57. The carrier 25, with the address of the next destination set thereon, then ascends the outgoing rail 52 and returns to the main rail 17 via a pivotal arm 54 provided at the forward end of the rail 52. The outgoing rail 52 is provided with temporary stopping devices 58 and 59 at two locations.

The foregoing process control terminal device 41 is attached, for example, to a post 60 for supporting the rails 51 and 52. The post 60 is supported by an upper portion of the building of the sewing factory. The place where the station is provided is the work area 32, in which a worktable is placed for a sewing machine or the like. The worker at the worktable performs some work on the article sent forward by the carrier 25.

FIGS. 3 and 4 show the temporary stopping device 59 at the second stage as well as the means for driving the carrier 25. The stopping device 59 has a frame 70, which is fixed at a lower mount portion 71 to the bottom of the rail 52 with screws. The frame 70 comprises the mount portion 71, an upstanding portion 72 extending upward from one side of the mount portion 71, a top portion 73 extending horizontally from the upper end of the upstanding portion 72, and a stopper support 74 including two parallel pieces which extend downward from the free end of the top portion 73. A stopper 76 is pivotably supported by a pin 75 on the stopper support 74 and biased by a spring 77 so that its lower end is directed downward. Attached to the support 74 is a member 78 by which the carrier 25 is prevented from falling off the rail 52 while running thereon.

A groove 79 is formed in a lower part of the frame upstanding portion 72 on the inner side thereof. The groove 79 has a smaller width at its opening than at its inner portion. A projection defining the groove 79 has a stepped portion 79a. The aforementioned output counting switch 42, which is a limit switch, is fixedly provided between the stepped portion 79a and the mount portion 71 by being biased by a spring 69. An actuator 68 has a supported end 68b which is nearly circular in cross section. The supported portion 68b is rotatably fitted in the groove 79. The other end of the actuator 68 extends to a position slightly above and close to a wheel supporting portion 52a of the rail 52. The actuator 68 is formed on its lower surface with a projection 68a, which bears on the plunger of the limit switch 42. While the carrier 25 is not positioned where the limit switch 42 is provided, the limit switch 42 remains off. When the carrier 25 passes this location, the wheel 61 of the carrier 25 depresses the supported end of the actuator 68, causing the projection 68a to lower the plunger to turn on the limit switch 42. When required, the wheel supporting portion 52a of the rail 52 may be partly cut out, with the other end of the actuator 68 made accessible to the cutout. The arrangement can be so adapted that the limit switch 42 will be turned on by the contact of the actuator 68 with a portion of the carrier 25 other than wheel 61. Furthermore, the limit switch serving as the output counting switch can be replaced by a photoelectric switch or the like, the optical path of which is blocked by the carrier 25 or on which reflected light is made incident by the carrier.

The other temporary stopping devices 56 and 58, although similar to the device 59 in construction, are not provided with the switch 42. The address setting device 57 is provided with a stopper the same as the stopper 76.

The rail 52 (as well as the rail 51) is hollow and has a slit 52b in its upper side. Inserted in the hollow portion of each of the rails 51 and 52 is a drive chain 66 extending approximately from the temporary stopping device 56 to a location a small distance upstream from the pivotal arm 54. Drive pawls 67 are pivotably mounted on the drive chain 66 as arranged at a suitable spacing. The drive pawl 67 is held in an upright position by an unillustrated spring. The drive chain 66 is driven by a pneumatic or hydraulic cylinder or some other drive means (not shown).

With reference to FIG. 2, on completing work on the article (part, semifinished product, product or the like) to be transported, the worker places the article on the hanger 64 of the carrier 25 or causes the hanger to grip the article and depresses a forward button (not shown) on the address setting device 57, whereupon the drive chain 66 is driven, causing drive pawls 67 to push the axles 62 of the carriers 25. Consequently, the carrier at the position (station) of the address setting device 57 is forwarded to the position of the temporary stopping device 58 at the first stage, the carrier at the temporarily stopped position in the first stage to the position of the second-stage stopping device 59, the carrier at the temporarily stopped position in the second stage onto the main rail 17 via the pivotal arm 54, and the leading one of the carriers at the position of the stopping device 56 to the station. The carrier reaching the position of each of the devices 58 and 59 pushes up the stopper 76 against the force of the spring 77, passes by the stopper 76, retracts some distance to the position of the stopper under gravity when the pushing force of the chain 66 thereafter ceases to act and is held in this position by the stopper 76. The carrier at the position of each of the stopping device 56 and the address setting device 57 pushes up the stopper there, passes the position and advances toward the next position. At this time, the address of the next destination station is set on the address portion 63 of the carrier concerned by the address setting device 57. When the chain 66 returns to the original position, the drive pawls 67 passing the positions of the carriers are pushed into an inclined position by the carrier axles 62.

The counting switch 42 is provided within the second-stage stopping device 59 as indicated in broken lines in FIG. 3 and is disposed slightly below, i.e., toward the first-stage stopping device from, the position of the carrier 25 stopped by the stopper 76. Accordingly, the switch 42 is turned on slightly before the carrier at rest at the first-stage stopped position passes the position of the stopper 76 when the carrier advances toward the second-stage stopped position. Of course, a carrier passing by the stopper 76 of the second-stage stopping device 59 will in no way turn on the switch 42 again. A carrier forwarded from the station to the first-stage stopped position will not turn on the switch 42 either. The switch 42 is turned on only when the carrier is sent from the first-stage stopped position to the second-stage stopped position.

It is likely that the worker, thinking that he has completed the specified work on a workpiece, will send the workpiece and the carrier at the station to the first-stage stopped position and thereafter become aware that the workpiece has not been completely worked on. In such an event, the worker will remove the carrier at the first stage-stopped position from the rail 52 and perform the unfinished work. If the output counting switch 42 were disposed between the station and the first-stage stopped position, the switch 42 would be turned on by the carrier and further turned on again when the carrier with the completed workpiece is forwarded from the station to the first-stage stopped position again after the unfinished work has been completed. Thus, the switch 42 will be turned on twice by the single workpiece, failing to assure accurate counting of output.

With the present system, the counting switch 42 is disposed between the first-stage stopped position and the second-stage stopped position. It is generally after a work operation and until the finishing of the subsequent work operation that the worker becomes aware of uncompleted work. With the present system, therefore, the likelihood that the switch 42 will be turned on twice owing to the above-mentioned worker's error is greatly reduced. The switch 42 may be at any location beyond the first-stage stopped position. As indicated at SW in FIG. 2, the switch 42 can be disposed at any location within the section of from slightly above the first-stage stopped position to a position close to the pivotal arm 54.

Stitched products, such as shirts, trousers or sportswear, are completed by subjecting suitably cut pieces of fabric to a plurality of specified processes, e.g., about 10 to 100 processes. Each of the work areas 32, 33 and 34 shown in FIG. 1 is assigned the work of a process of a single product. Some processes require much labor and time, so that the work of such a process may be carried out at a plurality of work areas. A plurality of processes, each involving simple work, may be conducted at a single work area. In this case, the name of a typical process or a collective name of a number of processes may be given to the work area to simulate a single process.

In any case, in producing a stitched article, a process and a worker for the production are assigned to each work area. The order of arrangement of work areas need not always correspond to the order of the processes, because the desired address can be set on the carrier by the address setting device 57 at each conveyor branch station to guide the carrier to the desired station (work area). The processes for different products can of course be set for the conveyor system shown in FIG. 1 if the number of work areas is sufficient.

With reference to FIG. 1, a piece cut off from a fabric for sewing at a cutting area 31 is gripped by a carrier, which is given the address for the first process and then delivered from a branch line 21 to the main line. The carrier is transferred from the main line 11 to the main line 12 via the connecting line 19 and forwarded to a branch line 22 for the first process. The piece is worked on at a work area 32 for the first process and gripped by the carrier, to which the address for the second process is given. Via the branch line 22, the carrier is returned to the main line 12 and guided to a branch line for a work area where the work for the specified second process is to be performed. In this way, the carrier carrying the piece is led through branch lines 22 and 23 for the work of specified processes in the order of processes via the main lines 11, 12 and 13, and the piece on the carrier is progressively made into a finished product. The finished product is carried along the main line 11, led to a main line 18 in a product stock area 34 and transferred to a specified branch line 28 therein for storage. A part or piece worked on at the work area 33 irrelevant to the conveyor system is carried by a worker to the work area 32 where work is conducted with use of the piece.

The main lines, 11, 12 and 13 each have an independent loop of the transport path. Accordingly, an address sensor such as the sensor 55 may be provided at the junction of the connecting line 19. The address sensor will serve to discriminate the addresses concerned with the relevant main line from those of the stations belonging to the other main lines. The main lines 11, 12 and, 13 may be combined to form an overall single loop of the transport path, such that the carrier transferred from the branch 21 to the line 11 invariably passes through the line 12, then returns to the line 11 again, subsequently passes through the line 13 and thereafter returns to the line 11. In this case, no address sensor will be needed at the junctions of the connecting lines 19. Although FIG. 1 shows several main lines, the conveyor system may, of course, consist of a single main line.

Figure 5:
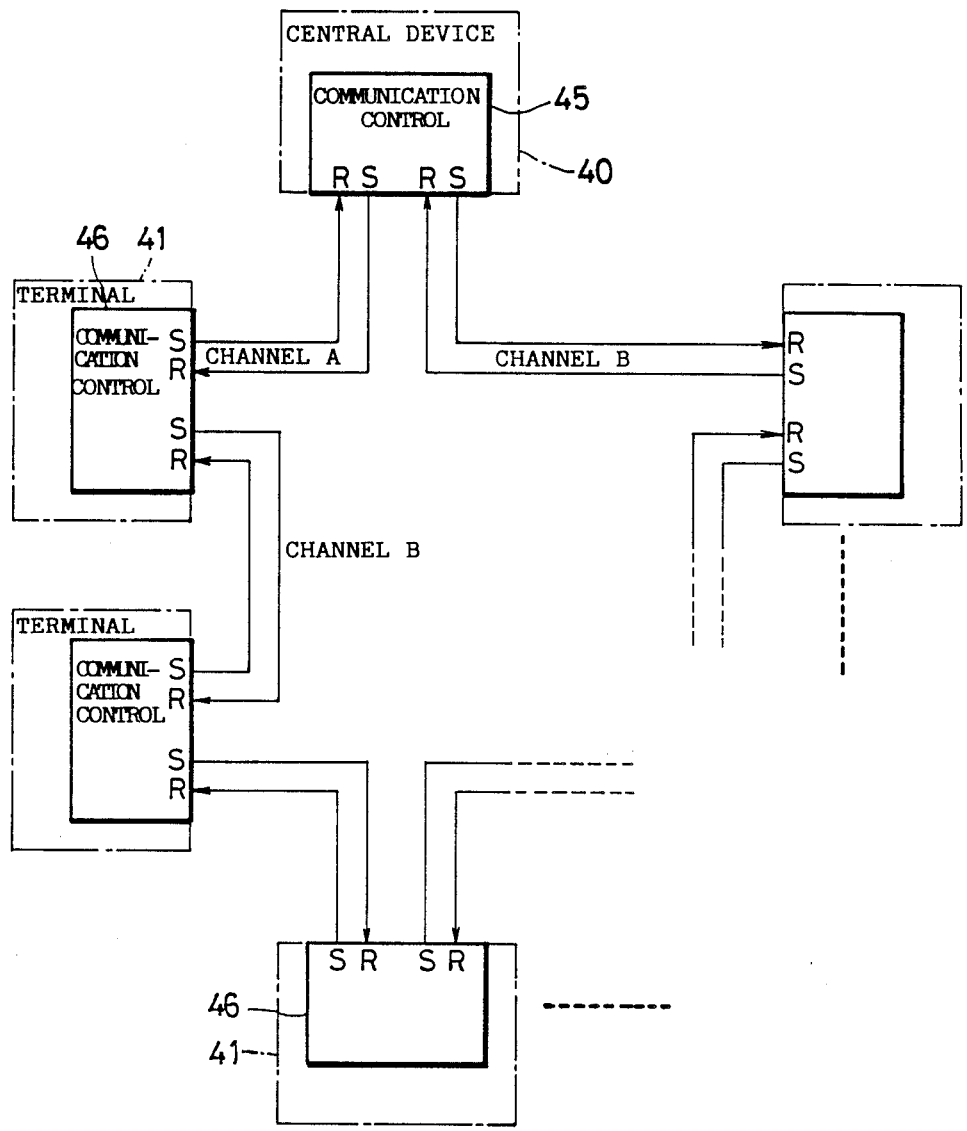
FIG. 5 is a block diagram showing the outline of a communication system.

The Communication System:

FIG. 5 shows that the terminal devices 41 provided for the work areas 32, 33 and 34 are connected to a central device 40 to perform required communications with the central device 40. To avoid transmission errors due to noises electromagnetically induced by fluorescent bulbs, sewing machine motors, etc. within the sewing factory, optical fibers are used for the communication lines to carry out communications through light transmission. The communications are performed by a full-duplex system. The communication system uses the polling selecting method wherein the central device 40 takes the initiative.

With reference to FIG. 5, the central device 40 and the plurality of terminal devices 41 are connected together in the form of a loop by light communication lines. The central device 40 and the terminal devices 41 respectively include communication control units 45 and 46 each having two pairs of sending and receiving terminals S and R, to which a pair of communication channels A and B is connected. Each communication channel A or B includes a sending line and a receiving line. Each terminal device 41 on the communication loop is connected to other terminal devices 41 immediately adjacent thereto, or to another terminal device 41 and the central device 40 which are immediately adjacent thereto. The same message (data) is transmitted through the communication channels A and B at all times. Since the same message is thus transmitted through the pair of transmission channels A and B, the central device 40 can communicate with all the terminal devices 41 even when a failure occurs at one portion of the communication lines. Further even if one of the communication control units 46 malfunctions, the terminal devices 41 other than the one with the faulty unit 46 can normally perform communications with the central device 40. While the central device 40 is performing a communication with the terminal devices 41, any terminal device 41 or the communication line can be repaired or removed from the loop, or a new terminal device can be added to the loop.

Figure 6:
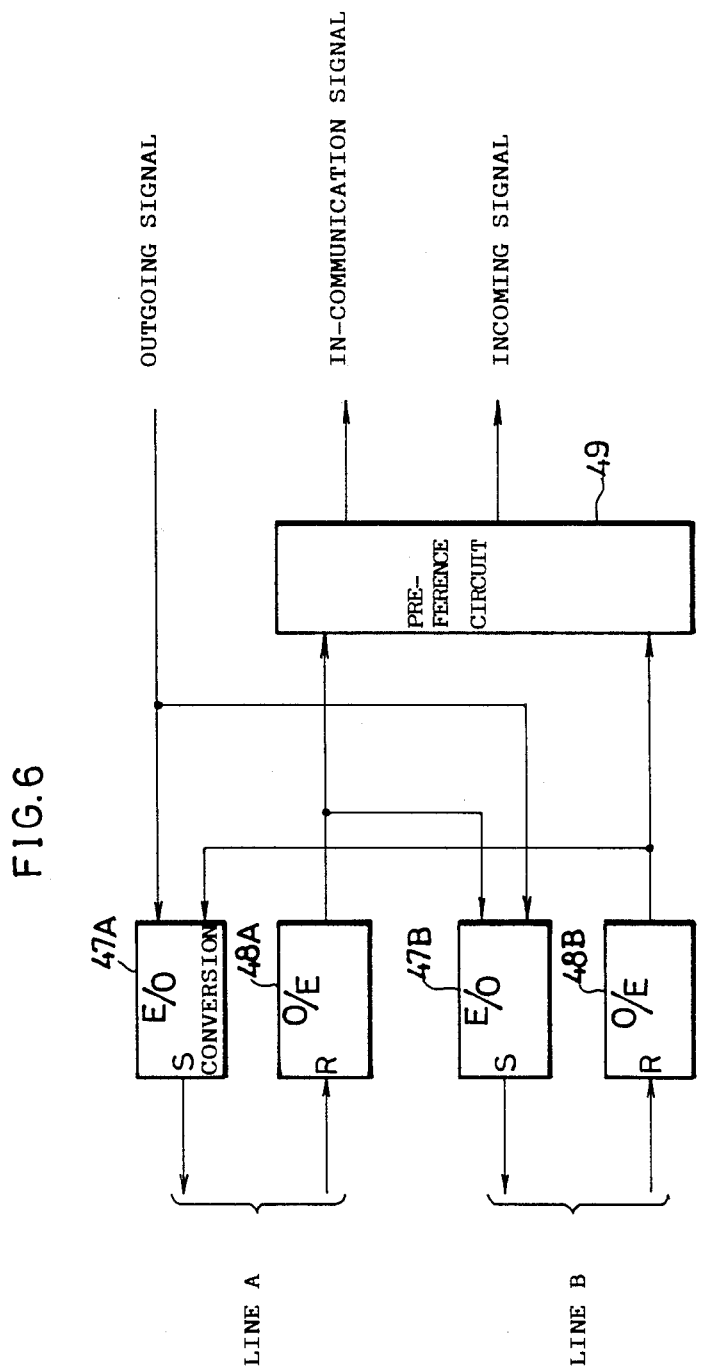
FIG. 6 is a block diagram showing the outline of a communication unit.

FIG. 6 schematically shows the construction of the communication control unit 45 or 46. While the same message is transmitted through both communication channels A and B, there is generally a slight lag between the time when the message through the channel A arrives at the unit and the time when the message through the channel B reaches the unit, so that the message data is likely to change if the two messages are superposed simply. To avoid this problem, the communication control unit is provided with a first arrival preference circuit 49.

The outgoing signal (message) from a terminal device or the like is fed to electro/optic (E/O) conversion circuits 47A, 47B, in which the signal is converted to an optical signal, which is then sent out through the the sending lines of the channels A, B at the same time.

The optical signal fed to an opto-electric (O/E) conversion circuit 48A is converted to an electric signal, which is sent to the first arrival preference circuit and to the E/0 conversion circuit 47B of the channel B. From the circuit 47B, the signal is sent out through the sending line of the channel B. When such an optical signal is received by an O/E conversion circuit 48B of the channel B, the signal is converted to an electric signal and sent to the preference circuit 49. The electric signal is also sent to the E/O conversion circuit 47A, in which it is converted to an optical signal and sent out through the sending line of the channel A. In this way, the signal received from the channel A is immediately sent out through the sending line of the channel B, while the signal received via the channel B is immediately sent out through the sending line of the channel A to realize duplex loop communications. Since the received optical signal is converted to an electric signal, which is sent out via a sending line upon conversion to an optical signal, the O/E and E/O conversion circuits serve as intermediate or relay devices, with the result that there is no need to consider the problem of attenuation of optical signals even if the loop communication lines have a large length. Also, even if the preference circuit 49 malfunctions, the signal received by the O/E conversion circuit is fed to the E/O conversion circuit and sent out to a sending line. Thus, the communication through the loop will not be interrupted.

When signals are received by the preference circuit 49 via the O/E conversion circuits 48A, 48B, the circuit determines which of the signal is the first to arrive, whereupon the circuit 49 delivers the earlier signal as the received signal. The delayed signal is prohibited from passing through the circuit 49. While receiving signals, the preference circuit 49 emits an in-communication signal, which is sent to the CPU of the terminal device or the like. While receiving this signal, the CPU stops transmission of outgoing signals. The outgoing signal is fed to the E/O conversion circuits 47A, 47B as stated above, so that when there is an incoming signal from the O/E conversion circuits 48A, 48B to the E/O conversion circuits 47A, 47B, the outgoing signal would otherwise be superposed on the incoming signal.

The Terminal Device

Figure 7:
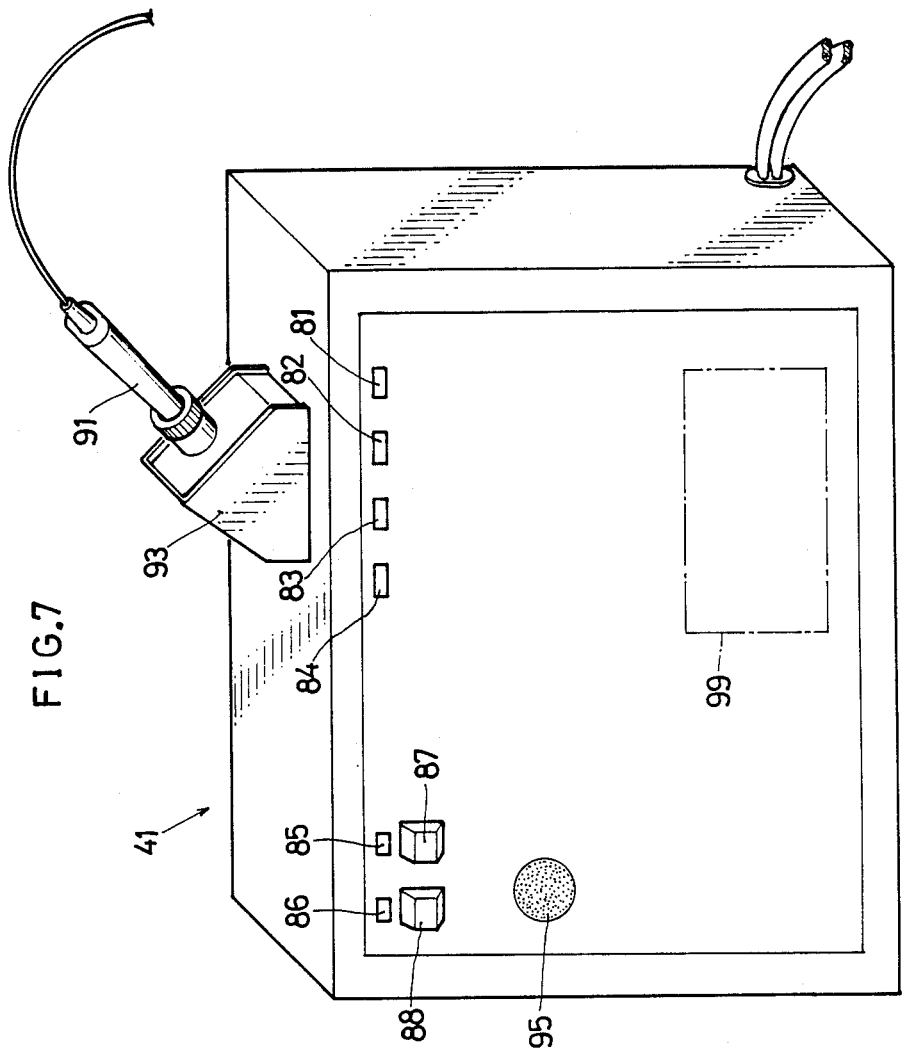
FIG. 7 is a perspective view showing the appearance of a terminal device.

FIG. 7 shows the appearance of the terminal device provided at the work area 32, 33 or 35. Provided on the front side of the case of the terminal device 41 are a power supply lamp 81, an operation lamp 82 for indicating that the device 41 is in normal operation, an input lamp 83 for indicating that a bar code input can be received and an error lamp 84 for indicating an error in connection with the bar code input. Also provided are a cancel button switch 87 for cancelling the input given by the output counting switch 42 or 43, and an overtime work button switch 88 which is used when the worker works overtime. In the vicinity of these button switches, there are pilot lamps 85 and 86 which go on when the corresponding switch is depressed. The lamps 81 to 86 comprise, for example, a light-emitting diode.

The terminal device 41 is provided with a bar code reader 91, which is used for entering the name of an article (product name), process name and worker name, i.e., codes representing these names. FIG. 10 shows a product name-process name card C1 and a worker name card C2. The former card C1 is issued by the central device 40 and given to the work area concerned when a process is set for the work area by the central device 40 when work is to be started for a particular day or when the production of a new article is to be started. The card C1 bears a bar code representing the name of the article (inclusive of article number, type number, etc.) for which work is to be done at the area concerned, and the name of the process for which work is to be done. The bar code may further contain a work area code. The worker name card C2, which is specific to each worker, bears a bar code representing the name of the worker who carries the card C2. The worker name card C2, which is carried by the worker at all times, is preferably coated with a transparent resin or the like. The card C2 can also be issued by the central device 40.

Figure 8:
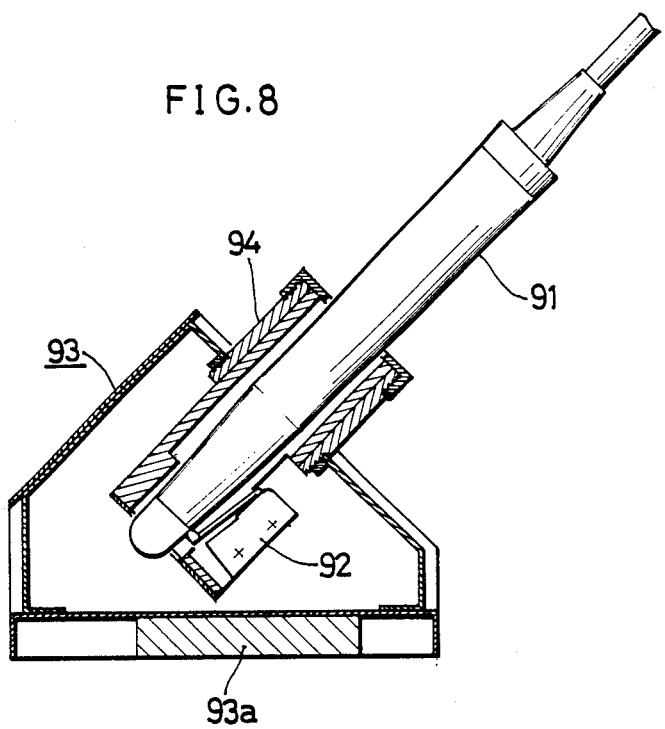
FIG. 8 is a sectional view showing a holder for a bar code reader.

With reference t FIG. 7, the case of the terminal device 41 is provided with a holder 93 for the bar code reader 91. As seen in FIG. 8, the holder 93 includes a tube 94 for holding the reader 91. The tube 94 has an open bottom. The holder 93 is provided with a switch 92 for detecting withdrawal of the reader 91 from the tube 94 of the holder 93. The switch 92 is off while the reader 91 is inserted in the tube 94 and is turned on when the reader 91 is withdrawn. A limit switch, photoelectric switch or the like is usable as the withdrawal detecting switch 92. The holder 93 is fixedly provided at its bottom with a permanent magnet 93a, by which the holder 93 can be attached to a desired portion of the metal case of the terminal device 41. The device 41 further has an alarm buzzer 95. It is desirable that a holder 99 for holding the product name-process name card C1 be provided on the front side of the case of the device 41.

Figure 9:
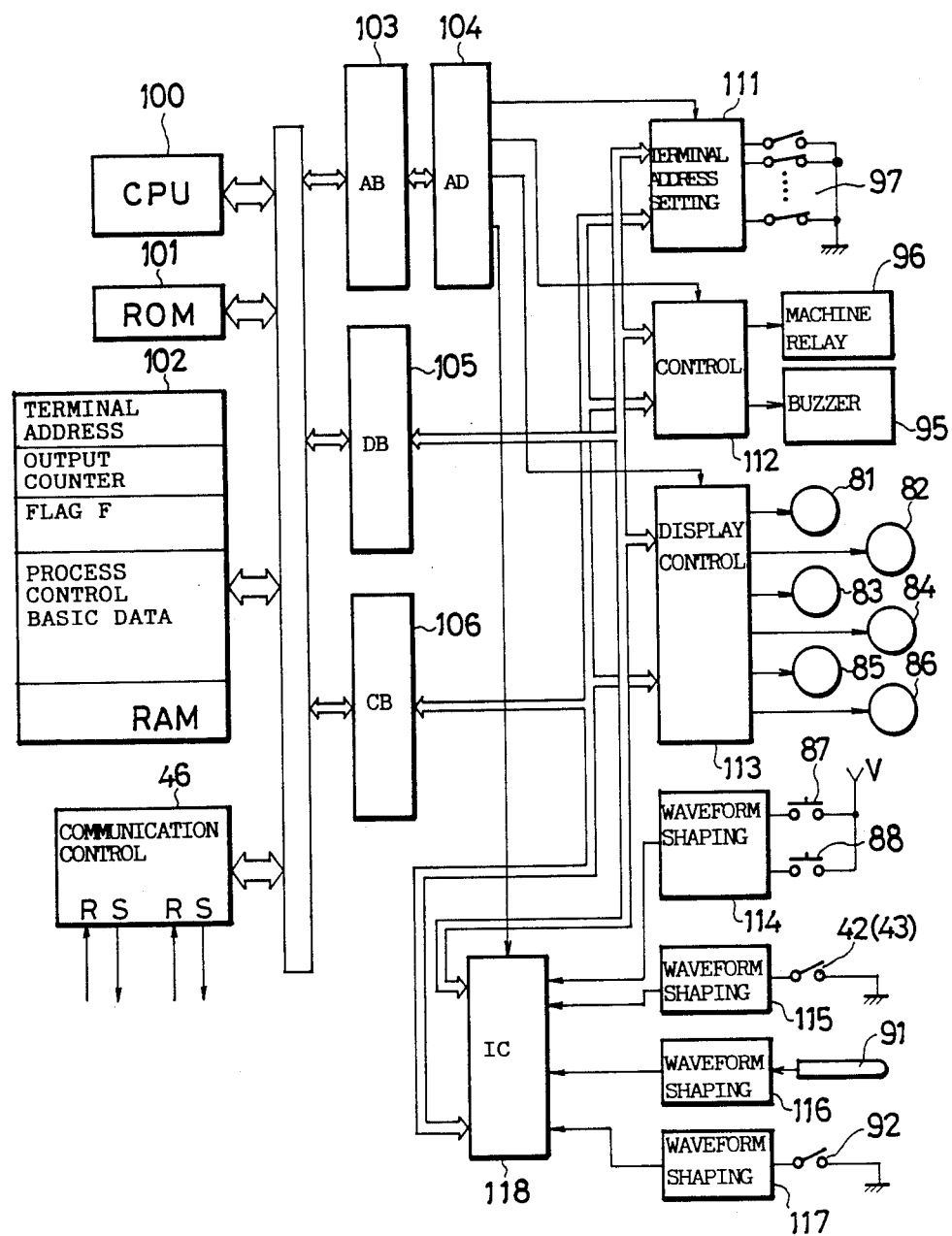
FIG. 9 is a block diagram showing the electrical construction of the terminal device.

FIG. 9 generally shows the electric construction of the terminal device 41. The terminal device 41 is controlled by a CPU, such as a microprocessor 100 which is provided with a ROM 101 having a program stored therein for the CPU and a RAM 102 for storing required data. Connected to the CPU 100 are the communication control unit 46 for performing communication with the central device 40, the foregoing indicating lamps, button siwtches and like input-output means. The input-output means for the CPU 100 include a terminal address setter 97, a sewing machine relay 97 for turning on or off the power supply for power sources for various kinds of work, such as sewing machine motors, buzzer 95, lamps 81 to 86, button switches 87, 88, output counting switch 42 or 43, bar code reader 91 and withdrawal detecting switch 92. The terminal address is used for communications with the central device 40. The terminal address setter 97 comprises, for example, eight DIP switches The address is expressed in an 8-bit binary number corresponding to on-off states of these switches. The states of the eight switches are read by a terminal address setting input circuit 111. The sewing machine relay 96 and the buzzer 95 are controlled and driven by a control circuit 112. The indicating lamps 81 to 86 are turned on or off or flickered under the control of a display control circuit 113. The input signals from the switches 87, 88, the output counting switch 42 or 43, the bar code reader 91 and the withdrawal detecting switch 92 have their waveform shaped by circuits 114 to 117, respectively and are fed to an interrupt control circuit 118. The input signals from the switches 87, 88, the switch 42 or 43 and the switch 92 serve as interrupt signals for the CPU 100. The interruption by the detecting switch 92 is given the highest order of priority. The interface circuits 111 to 113 and 118 (shown as I.C.) between these input-output means and the CPU are connected to the CPU 100 by bus lines via an address buffer (A.B.) 103, a data buffer (D.B.) 105 and a control buffer (C.B.) 106. The address signal to be given to the address buffer 103 is decoded by an address decoder (A.D.) 104 and converted to a signal for specifying the interface circuits 111 to 113, 118.

The RAM 102 connected to the CPU 100 has an area for storing the communication address of the terminal device read from the address setting input circuit 111, an area for use as an output counter, an area having a flag F for use in cancelling the output count input, an area for storing process control basic data such as the product name, process name, worker's name, output, etc., and the like. The basic area data stores only the data on the work area in which the terminal device is installed.

Figure 11:
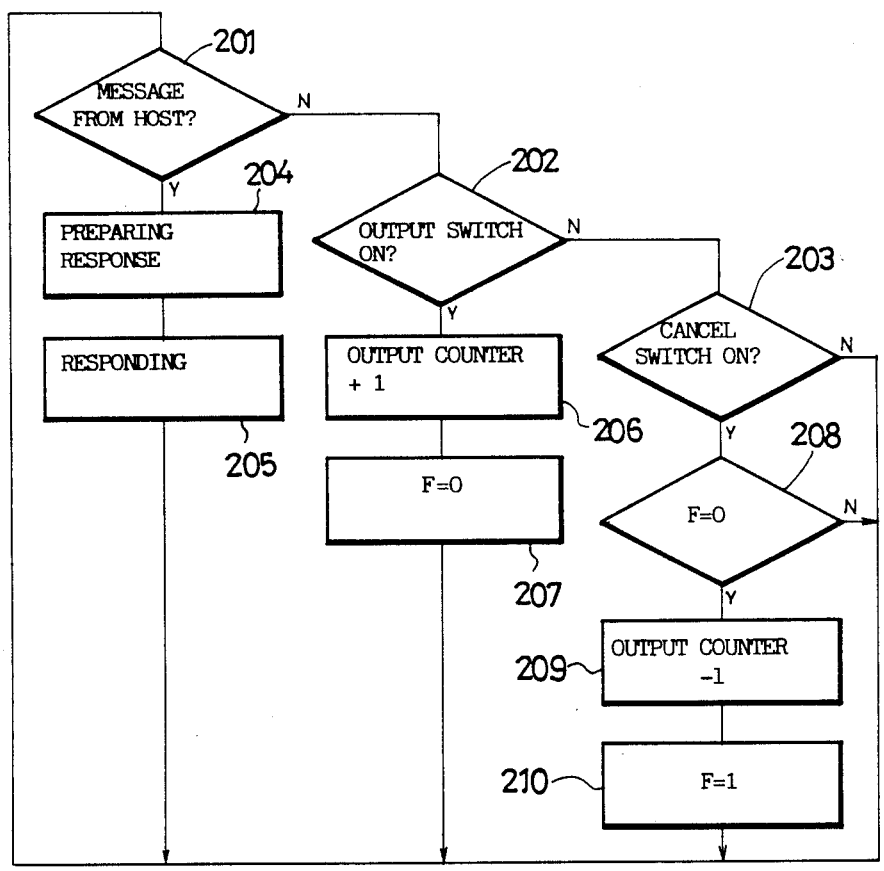
FIG. 11 is a flow chart showing the usual operation of the terminal device.

FIG. 11 shows the usual operation of the terminal device 41. Usually, the device 41 performs processing for communications with the host CPU 120 (see FIG. 13) of the central device 40 and output count processing. More specifically, the CPU 100 checks at all times whether a poll or select message is given to its own address from the central device 40 (step 201), whether there is an ON input from the output count switch 42 or 43 (step 202), and whether a cancel input is fed from the cancel switch 87 (step 203). When a poll message is received from the central device 40, the terminal, if it has the data to be transmitted to the central device, responds to the inquiry with the data. For example, a message containing a count of output (value counted by the output counter), data read by the bar code reader 91, and the receipt of an input from the overtime work switch 88 is prepared and sent to the central device 40. If there is no data to be sent, a response message to this effect is forwarded to the central device 40. If a select message is received, the terminal answers the inquiry as to whether it is ready for receiving data from the central device 40 (steps 204, 205). The data to be delivered from the central device 40 includes set or changed product name, data relating to the process name, process control basic data, etc.

When the output counting switch 42 or 43 gives an interrupt input, the count on the output counter advances by 1, and the flag F is reset (steps 206, 207). By this procedure, output is counted at the work area. When there is an interrupt input from the cancel switch 87, 1 is subtracted from the count on the output counter only when the flag F is reset (step 208), and the flag F is set (step 210). Upon setting of the flag F, the cancel lamp 85 is turned on. The flag F remains set until the next interrupt input is fed from the output count switch 42 or 43 (steps 206, 207). Accordingly, even if the worker depresses the cancel switch 87 twice in succession, the flag is in the set state when the second input is given (step 208), so that 1 will not be subtracted from the count again.

When there is a change of worker, the output count of the replaced worker is transferred to a specified area, the counter is then cleared and the counting of the output of the incoming worker is started.

As already stated, the counting switch 42 is provided on the outgoing rail 52 of the branch line 22 at a location downstream from the first-stage stopping device 58, so that when the worker becomes aware that a carrier 25, which has been sent out, should not be counted up, she may remove the carrier 25 from the rail 52 at the position of the stopping device 58 or at a location upstream therefrom. The switch 42 then will not count up the carrier 25. However, it is likely that the worker will realize that she should not have sent out the carrier 25 after the carrier has passed the position of the switch 42. It is also likely that the output counting switch at the work area 33 irrelevant to the conveyor line will be actuated by error. The cancel switch 87 is provided to meet such a situation, i.e., to assure accurate counting of output.

The product name and process name are set or changed by the operator at the central device 40. When the product name and process are set or changed, the abovementioned product name-process name card C1 is prepared for each work area and given to the worker at each area. Further the set or changed product name and process are transmitted from the central device 40 to each terminal 41. Preferably, cards C1 are distributed as held and transported by carriers 25 on the conveyor line. When the card C1 is delivered, the worker at each work area enters the card data by the bar code reader 91. The entered product name and process name data are sent from the terminal device 41 to the central device 40 for acknowledgement, while the terminal 41 checks the input data with the data already delivered from the central device 40.

The data relating to workers' names is entered solely by the terminals 41. When starting a day's work or in the event of a change of worker, the worker at each work area enters the data on her own worker name card C2 with use of the bar code reader 91. The input name data is transmitted from the terminal device 41 to the central device 40. To assure the principle of "right person in right place," or for some personal reason, or to assure a balance between processes, the worker at the work area changes relatively frequently. Accordingly, it is difficult for the operator at the central device 40 to recognize changes of many workers without the aid of a computer. With the present system, every time the worker changes at each work area, the terminal device 41 sends data as to the change to the central device 40, eliminating the need for the central device operator to enter the data as to workers' names and permitting the central device to recognize the data.

The terminal device 91 always performs processing for communication with the central device 40 and output counting processing as already stated. The input processing for product name, process name and worker name, although done only sporadically, is to be given the highest preference. Whenever the worker enters the product name, process name and her name with use of the bar code reader 91, she grasps the reader 91. The terminal is therefore adapted to perform the input process utilizing the manipulation of the reader 91 by the worker. When the reader 91 is withdrawn from the holder 93 in which it is usually inserted, the withdrawal detecting switch 92 is turned on. Based on the ON signal from the switch 92, the interrupt control circuit 118 feeds an interrupt signal to the CPU 100. The interruption by the switch 92 is given the highest preference as already stated, so that the CPU 100 immediately execute an interrupt process.

Thus, the bar code reader holder 93 is provided with the withdrawal detecting switch 92, and an interrupt signal is produced in response to the detection signal from the switch to assure an interruption with the highest preference. This eliminates the necessity for the CPU 100 to always check on the program whether there is an input from the bar code reader 91, consequently ensuring the CPU 100 of an efficient operation. If the withdrawal detecting switch 92 were absent, the worker would have to depress a specific switch for entering the product name, process name and her name to enter an interrupt signal. However, with an automatic interruption effected by the switch 92, the worker merely needs to grasp the reader 91 to immediately follow the procedure of reading the bar code, which is a very simple procedure.

Figure 12:
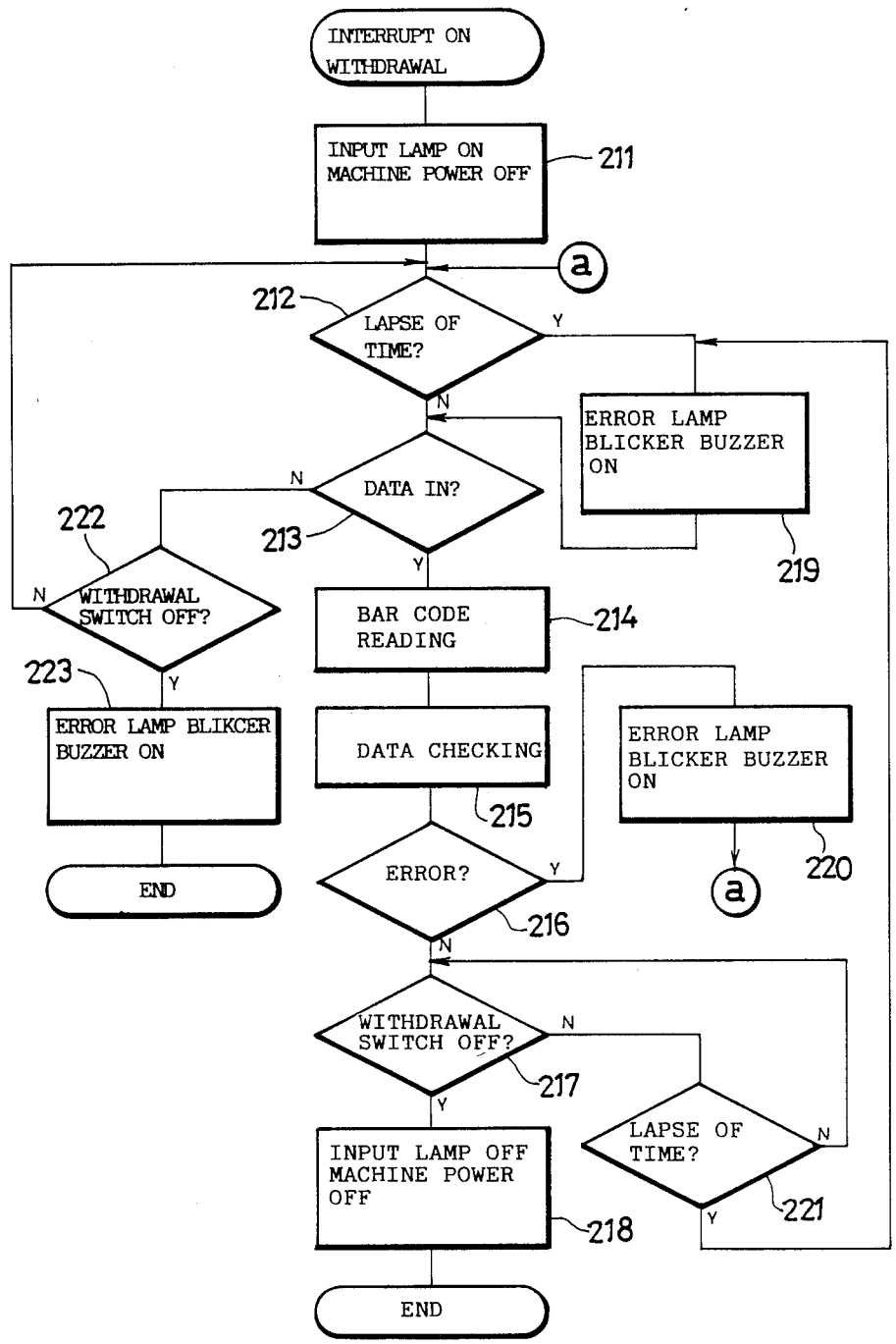
FIG. 12 is a flow chart showing interrupt processing to be done upon sensing withdrawal of the bar code reader.

FIG. 12 shows interrupt processing following the detection of widthdrawal of the bar code reader. Upon the detection of the withdrawal of the reader 91 by the switch 92, the input lamp 83 goes on, indicating that the reader 91 has been withdrawn. At the same time, the relay 96 turns off the power supply to working machine such as sewing machine (step 211). Before a period of time, e.g., several seconds to tens of seconds, elapses, the bar code on the card C1 or C2 is scanned by the reader 91 handled by the worker and is thereby read (steps 212 to 214). The bar code data read is then checked (step 215). When the product name and process name are set or changed, the set or changed data has already been delivered from the central device 40 to the terminal device 41, so that the data as to the product name and process name forwarded to the terminal 41 from the device 40 is compared with the read data for checking whether the two items of data match. If the data items do not match, an error has occurred. In reading the card C1 or C2, the read data is also checked as to the format, etc. to check whether the card is a proper one. Whether the code is read without error is also checked. If there is no error, and the bar code reader 91 is thereafter inserted into the holder 93, the switch 92 is turned off (step 217), whereupon the lamp 83 goes off, and the machine power supply is turned on (step 218). The bar code reading procedure thus completed is followed by the usual operation again. The worker resumes the specified sewing work.

When the bar code reader 91 is withdrawn and then re-inserted into the holder 93 without scanning any bar code, the lamp 83 similarly goes off, and the machine power supply is turned on (steps 222, 223).

If there is some error when the bar code is read, the error lamp 84 flickers, and the buzzer 95 gives an alarm (step 220), whereupon the worker follows the bar code reading procedure again.

When there is no input of read data from the reader 91, despite the lapse of the above-mentioned period of time after the withdrawal of the reader 91, and also when the reader 91 is not returned to the holder 93 despite the lapse of the above period of time, the error lamp 84 flickers and the buzzer 95 goes on (steps 212, 219; 221, 219). This makes the worker aware that the bar code has not been read or that the reader 91 has not been inserted in place, whereupon the worker follows the specified procedure.

Also when the bar code reader 91 becomes removed from the holder 93 for one cause or another, the lamp 83 goes on, and the machine power is turned off (step 211). A specified period of time thereafter, the lamp 84 flickers and the buzzer 95 goes on (step 219), notifying the worker of the removal of the reader 91.

The terminal device 41 has the input lamp 83 and the error lamp 84, and these lamps go on according to the state of the reader 91. This manifestly indicates the state of the reader and makes the reader easy to use, while notifying the worker of a fault, if any. Consequently, an error in procedure or an abnormality will not be left uncorrected. Especially because the detection of withdrawal of the bar code reader 91 is followed by an interruption procedure, the usual operation of the terminal device 41, i.e., processing of communication with the central device 40 and output counting processing, will not be effected properly if the reader is left withdrawn for a long period of time. However, such a situation is avoidable by the above expediency.

The Central Device

Figure 13:
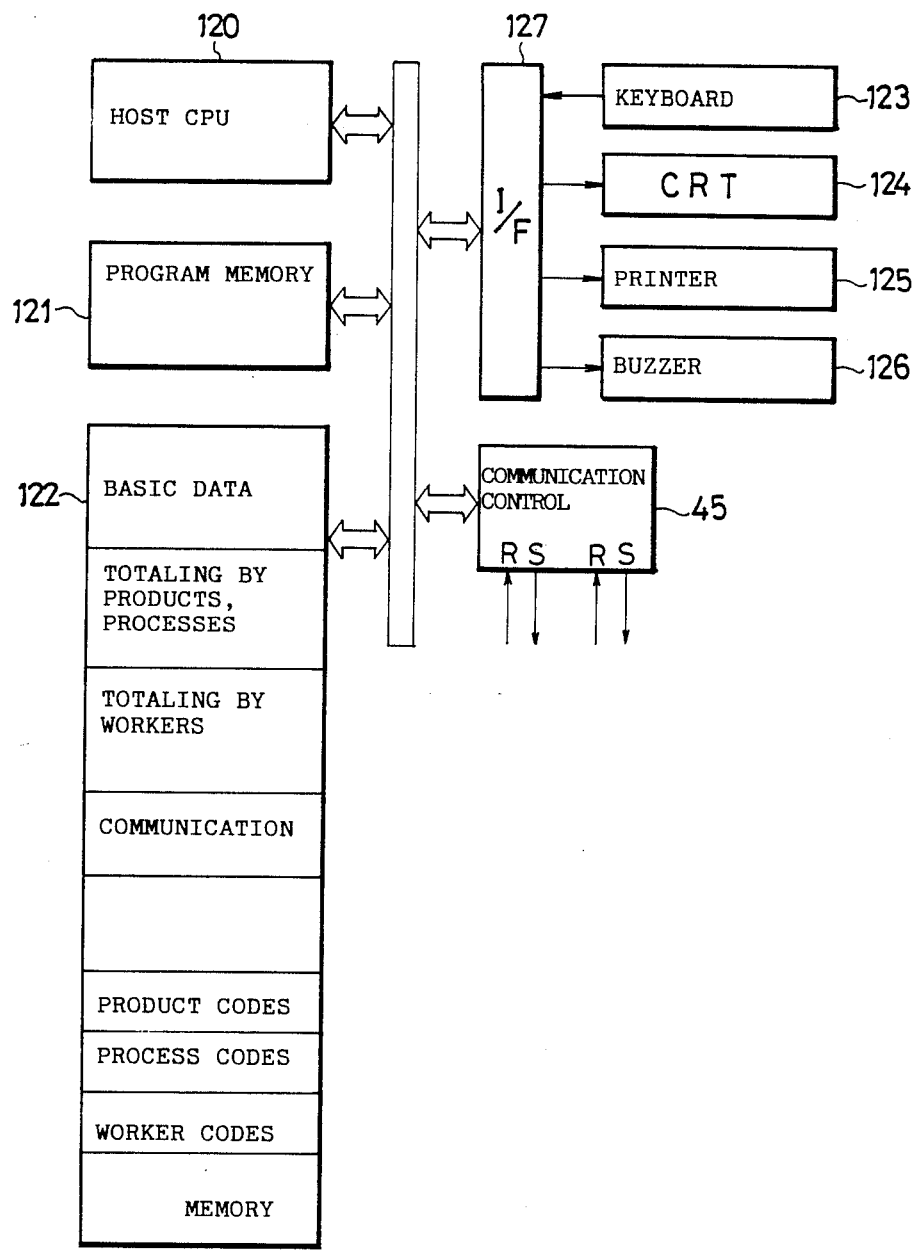
FIG. 13 is a block diagram generally showing the electrical construction of a central device.

FIG. 13 generally shows the electric construction of the central device 40. The device includes the host CPU 120, which has a memory 121 having a program stored for the CPU and a data memory 122 for storing various items of data for controlling the sewing process. Connected to the host CPU 120 through a suitable interface 127 are a keyboard (including a light-pen) 123 for entering data or instructions for setting purposes and giving outputs, a CRT 124 for displaying various items of data, such as outputs, for sewing process control as will be stated later, a printer 125 for printing out such data and for preparing the cards C1, C2, and an alarm buzzer 126. The foregoing communication control unit 45 is also connected to the CPU. The data memory 122 has an area (data buffer) for storing basic data for the sewing process control, an area for storing a series of processes set under each product name and totaling outputs as classified by product names and processes, an area for totaling outputs as classified by individual workers, an area for communication with terminals, an area for storing character codes for displaying or printing names of products, processes and workers, in corresponding relation to these names, and other areas. The memory 122 has stored therein, in addition to the above data, series of processes set before or until the previous day, standard pitch time data for typical processes, etc. The process data in the past is used as basic or reference data when setting new processes.

Figure 14:
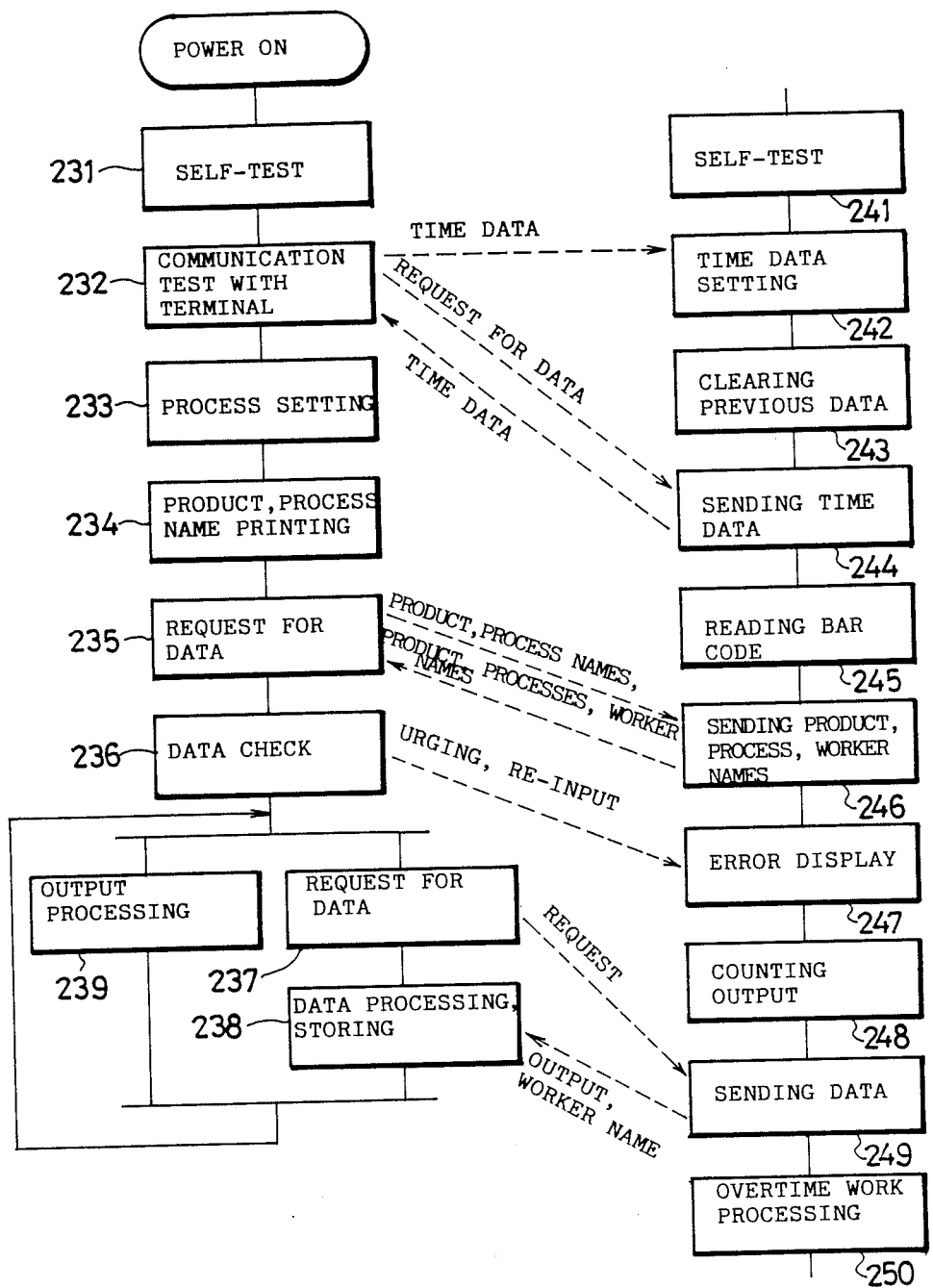
FIG. 14 is a flow chart schematically showing the operative relation between the central device and the terminal device.

FIG. 14 schematically shows the operative relation between the central device 40 and the terminal device 41. This diagram shows the general flow of operation of the central device 40 at left, and that of the terminal device 41 at right. Before the start of operation at the sewing factory, the power supply for the central device 40 is turned on in the morning, whereupon the host CPU 120 checks whether the device 40 operates normally, by self-diagnosis test (step 231). Confirmation of the date and time is followed by a communication test with each terminal device 41 (step 232). For this test, the central device 40 transmits time data to the terminal 41, which in turn returns the same time data to the central device 40.

The power supply for the terminal device 41 is continuously on at all times and need not be turned on by the worker. The terminal device 41, operating in standby mode, is adapted to be brought into the operation illustrated in FIG. 14 in operative relation with the closing of the main power supply switch of the sewing factory. As is the case with the central device 40, a self-diagnosis routine is executed first (step 241). Upon receiving the time data from the central device 40, the clock time of the terminal 41 is adjusted to match the clock time of the central device 40 (step 242). In this way, all terminal devices 41 are set to the same clock time. Subsequently, the RAM 102 is cleared of the previous day data, such as basic data, and the output counter is cleared (step 243). In response to a request for data by the central device 40, the terminal device sends the time data already received to the central device 40 (step 244).

When the central device 40 receives from a terminal device 41 the same time data as was sent to that device 41, the central device judges that the terminal and the communication is in normal operation. If some error has occurred, transmission of the time data is repeated three times between the central device 40 and the terminal device 41. If the error still remains despite three repetitions of such a communication, it is judged that the terminal concerned or the communication system is faulty, and the CRT 124 shows this result. The faulty terminal device is repaired or removed.

Next, at the entral device 40, the operator sets a product name and processes for the work of the day (step 233). In other words, to each work area in the sewing factory, the work (process) to be performed there is assigned. If the previous day work is to be resumed, the process setting data for the previous day will be used as it is. A simple modification, may be made in some cases. Process setting data from the past may be utilized as it is or as slightly modified, or totally new processes may be set. In any case, area codes are displayed on the CRT 124 as seen in FIG. 16, and a series of processes are set by entering the contemplated process name and product name for each area code using the keyboard or light-pen. The set processes are stored in the basic data area, etc., of the memory 122. Preferably, process setting is made on the previous day, in which case step 233 only confirms the setting. In accordance with the set process, a worker is assigned to each work area. In this stage, the name of the worker has not been entered in the central device 40, because the worker's name is entered in the terminal device at each work area with use of the worker name card C2 as already described.

After product and process name setting, the set product name and process name are printed out in the form of a bar code by the printer 125 to prepare a product name-process name card C1 for each work area (step 234). The cards C1 thus prepared are distributed to the work areas or workers by working personnel or utilizing the conveyor system. The product name and process name assigned to each work area are sent to the terminal device 41 concerned (step 235).

At each terminal 41 of work area, the bar codes on the distributed card C1 and the worker name card C2 carried by the worker are read by the reader 91 (step 245). The product name and process name thus entered by the reader 91 are checked with those sent forward from the central device 40 as described above. If there is a request for data by the central device 40 (step 235), the product, process and worker name data read by the reader 91 is sent from the terminal 41 to the central device 40 (step 246).

Upon receiving the above data from the terminal 41 in response to the request, the received data is checked with the data of already set product name and process name (steps 235, 236). The worker name data transmitted from each terminal device 41 is cored in the basic data area of the memory 122. If an error is found in the names forwarded from the terminal device 41 or no name data is received, the terminal 41 is urged or instructed to send the data or enter the data again. In such a case, the error lamp 84 flickers or the buzzer 95 goes on (step 247).

The processing for the start of work is thus completed. The terminal device 41 thereafter performs the aforementioned usual operation, i.e., output count processing and transmission of count data, etc., to the central device (steps 248, 249). When the overtime button switch 88 is depressed at 16:45 or later for overtime work, the central device 40 is notified of this by the terminal device 41 (step 250).

The central device 40 requests the terminal device 41 to send data, at a given time interval, e.g., every several minutes, and processes and stores various data, such as output counts, forwarded from the terminal (steps 237, 238). The central device 40 performs (electrical) output processing (step 239) to display on the CRT 124, or print out by the printer 125, various items of process control data in response to instructions keyed in by the operator with the keyboard 123.

Figure 15:
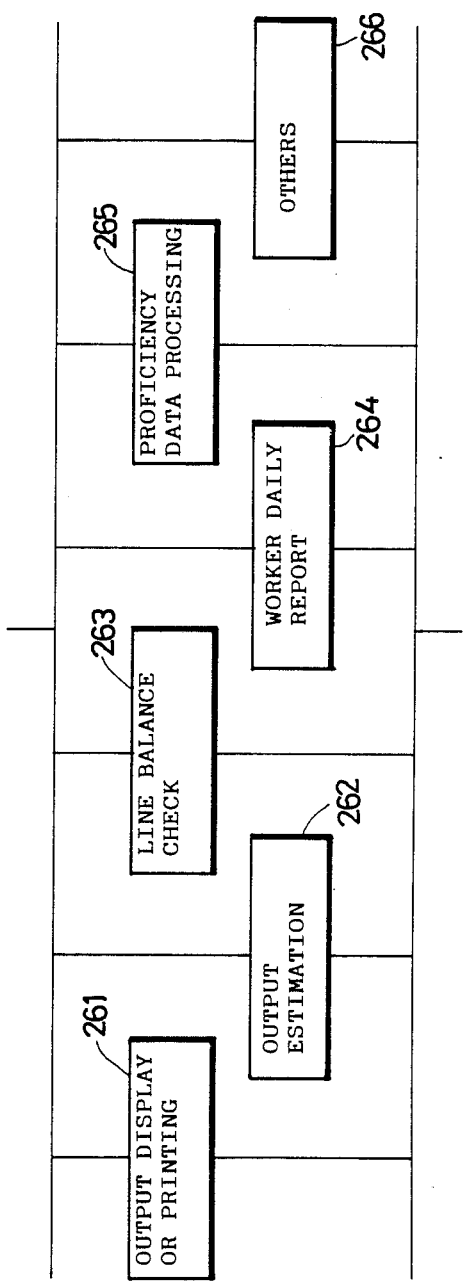
FIG. 15 is a flow chart schematically showing output processing by the central device.

FIG. 15 shows typical examples of (electric) output processing procedures (FIG. 14, step 239) performed by the central device 40. These examples are as follows. In step 261 of (electric) output processing for displaying or printing output (i.e., amount of work done), the output (work amount) as classified by products, processes and individuals or workers is displayed on the CRT 124 or printed out by the printer 125 in the form of a graph or table. Each process output to be obtained in a specified period of time, e.g., one hour, is calculated and delivered as an electric output by step 262 of processing for output estimation. The variation of output between processes is determined and delivered as an electric output by step 263 of processing for line balance check. In worker daily report output processing (step 264), data relating to the daily work of each worker and evaluation thereof is prepared and delivered as an electric output. Data as to the proficiency of each worker is prepared and delivered by step 265. Other processing is also performed (step 266).

Processing for Displaying or Printing Output (work amount)

FIG. 17 shows part of the basic data area of the data memory 122 of the central device 40. This data area stores all data relating to one day's work at each work area within the sewing factory. For the area code of each work area, there are locations for storing state flags, product name codes, process codes, worker name codes, outputs, actual pitch time values, standard pitch time values, actual work hours, etc. The state flag is used to show the host CPU 120 the data of which of these storage location is (was) written, retrieved or otherwise handled. Since it is likely that a plurality of product names or process names will be set for a day at one work area, a plurality of product name codes and a plurality of process name codes can be stored. One process may be practiced by at least two workers alternately, so that a plurality of worker name codes can be stored. These name codes are stored as associated with the product name and process name codes. The output is stored according to time zones which are divisions of a day. With the present embodiment, the time zones are 8:15–10:00, 10:00–12:00, 12:00–15:00, 15:00–16:45 and after 16:45. For the sake of simplicity, these times zones will be referred to as 10:00, 12:00, 15:00, 16:45 and overtime time zones. The output during each time zone is stored as associated with worker name code. The term "actual pitch time" means the period of time actually taken for a worker to perform the work of one unit of a process. To explain this in connection with the conveyor system, the actual pitch time is the period of time from the delivery of one carrier, until the delivery of the next carrier during which time the article on the latter carrier is worked on. This pitch time is measured by factory personnel. The actual pitch time is used for calculating a theoretical output and line balance check. The term "standard pitch time" refers to a standard period of time required for performing the work of one unit of a process and generally is determined statistically. The actual work time is the period of time during which a worker actually works. One day's actual work time is obtained by subtracting the recesses during the day from the sum of the time zones. Actual work time during each time zone, which is obtained by subtracting the recess during the time zone from the time zone period, and the actual work time of each worker, are also stored. The standard pitch time and actual work time are used for calculating the proficiency of each worker. The actual pitch time and actual work time are stored as associated with the worker name code, and the standard pitch time with the process code. The actual pitch time and standard pitch time are entered by the operator with use of the keyboard 123. As to the standard pitch time, the corresponding data in the past stored in the memory 122 for tee same process is usable.

The basic data area within the RAM 102 of the terminal device 41 always has stored therein data as to the work area in which the terminal 41 is installed, and this data is identical with all the data stored for that area in the basic data area of the memory 122 of the central device. Accordingly, even if one of the memories becomes faulty, the data can be completely backed up.

Figure 18:
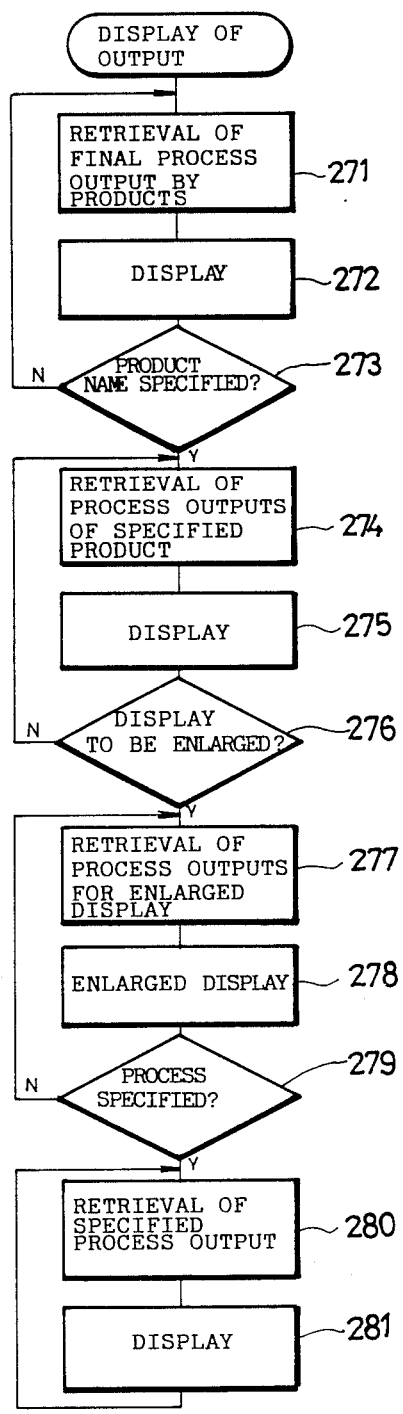
FIG. 18 is a flow chart generally showing the usual output (amount of work done) display processing.
Figure 19:
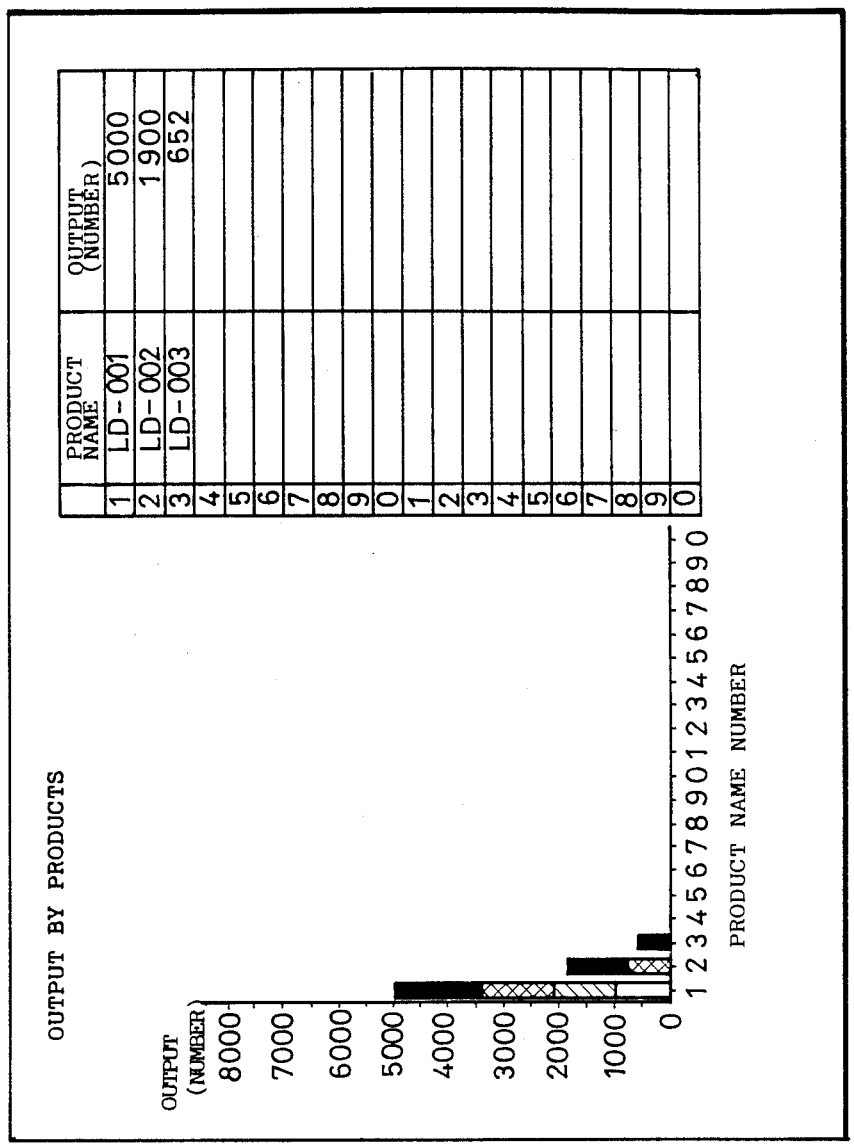
FIG. 19 shows an example of display on the CRT showing output by products.

FIG. 18 shows the outline of the usual processing for displaying outputs. Output display includes display of output as classified by product names, display of output by processes for one product, enlarged display of output by processes, and display of output as classified by individuals (workers) for one product in one process. When an output display instruction is given by the key-board 123, the output by product names is first shown on the CRT 124. From the basic data area of the memory, each process code and output for each kind of product are transferred to work areas. The output (according to time zones) of the final process, e.g., ironing process, is searched for each product, and the output sum of the final process up to the current time is calculated (step 271). The output sum of the final process represents the number of finished products of the particular kind. As seen in FIG. 19, the final process output sum of each product name is displayed in the form of a graph and table on the CRT 124 (step 272). In the graph and table, like products are referred to by like product name numbers. The CRT 124 also shows the date and time of display. In the bar graph of FIG. 19, the output up to 10:00 is represented by a blank portion, the output up to 12:00 by a hatched portion, the output up to 15:00 by a mesh portion, and the output up to the display time by a solid portion. These portions are shown in different colors.

Figure 20:
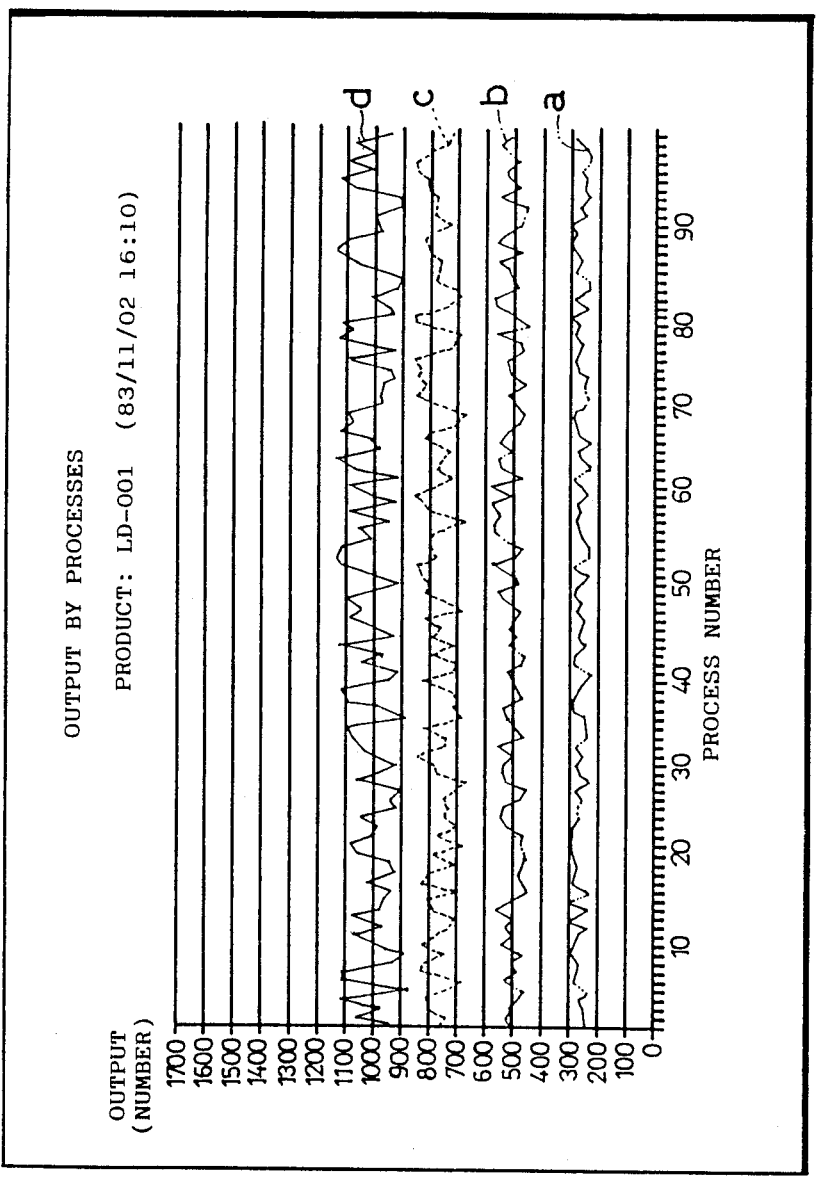
FIG. 20 shows an example of a CRT image for displaying output by processes.

When one of the products shown is specified by the keyboard or light-pen (step 273), the outputs of all processes for the specified product are searched for, and the sum of outputs of each process as classified by the time zones is calculated (step 274). The data thus retrieved includes: the output (sum) "a" during 10:00 time zone, sum "b" which is the output "a" plus the output of 12:00 time zone, sum "c" which is the sum "b" plus the output of 15:00 time zone, and sum "d" which is the sum "c" plus the output of 16:45 time zone up to the display time. As seen in FIG. 20, these sums "a" to "d" are graphically shown on the CRT 124 in different colors for each process represented by a process number step 275). In FIG. 20, the two-dot-and-dash line, one-dot-and-dash line, dotted line and solid line are, for example, red, blue, yellow and white. The display of output by processes manifestly indicates the progress of work (line balance) for the specified product.

The four sums "a" to "d" are shown in FIG. 20 since the display is given at 16:10. The display, if given for example at 14:00, includes the sums "a" and "b" and a sum "e" which is the sum "b" plus the output of 15:00 time zone up to 14:00. When the display is given during the overtime time zone, the output of 16:45 time zone plus the overtime output will be shown. The output by processes may be displayed in the form of a table. When another product is specified, the process outputs of the newly specified product will be similarly shown (steps 273 to 275).

Figure 21:
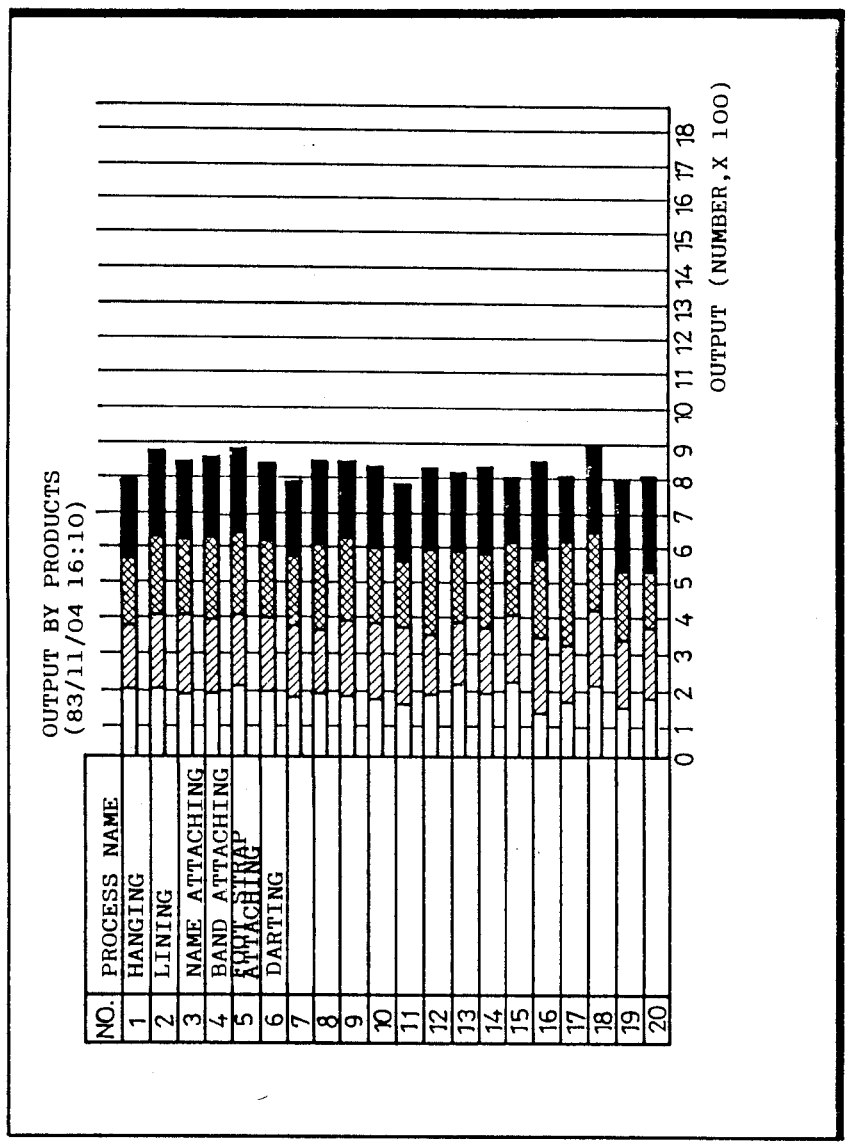
FIG. 21 shows an example of a CRT image for displaying output by processes on an enlarged scale.

When the operator desires to see some process portions of the process-wise output display, the operator specifies the range of portions to be enlarged (the number of processes included in the range is predetermined) or the main process within this range by the keyboard or light-pen (step 276), whereupon the process names of the specified range and the outputs thereof are retrieved (step 277), and the outputs of a plurality of processes are displayed in the form of an enlarged graph on the CRT 124 as shown in FIG. 21 (step 278). The sums corresponding to the sums "a" to "d" are shown in different colors as in the case of FIG. 19.

When it is desired to view the details of one of the plurality of processes thus displayed, the desired process (for the specified product) is specified (step 279), whereupon the output of the product as classified by workers for the process is retrieved (step 280). Fig. 22 shows the data thus retrieved in the form of a table, revealing the product name, process name, worker's names and individual (worker) outputs achieved up to the display time (step 281), i.e., display of output by product, process and workers.

It is of course possible to print out by the printer 125 the various items of output data shown in FIG. 19 to FIG. 22.

Figure 23:
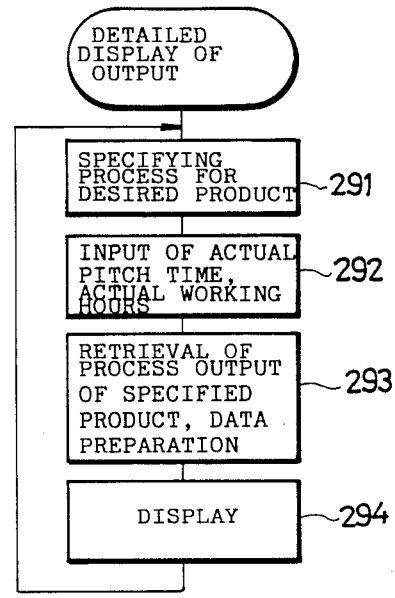
FIG. 23 is a flow chart generally depicting the processing for displaying work output.

FIG. 23 shows a further detailed example of output display, in which individual worker outputs are shown in detail as classified according to the kind of product, process name and time zone in detail. First, the operator specifies the desired product and process (step 291). Further the actual pitch time and actual work time for the process are entered (step 292). The actual work time may be calculated by the CPU 120. The output of the specified product and process is retrieved and the required data is prepared and shown on the CRT 124. FIG. 24 shows the output data as classified by processes and time zone for the particular product on the display. If required, the data is printed out by the printer 125 (steps 293, 294). FIG. 24 shows the data which is obtained on completion of one day's work. When the work of one process is conducted at a plurality of work areas, the data as to all the areas for the same process is displayed. When a plurality of workers work at one work area, data as to each worker is displayed. In any case, output is obtained for each the workers working for the same process, the output including the work area code, process name, output and sum thereof in each time zone, actual pitch time, theoretical output calculated with use of the pitch time, and the difference between the theoretical output and the output sum of each worker for the day (excess or deficit). The theoretical output is determined by dividing one day's actual work time by the actual pitch time.

Such detailed data is given not only on completion of daily work but also at a desired time specified by the operator and further automatically periodically, e.g., at 10:00, 12:00, 15:00 and 16:00. At such a point in time, the output up to that time will be given as classified by time zones. If the actual pitch time is not fed, the theoretical output or excess/deficit will not be given.

Processing for Output Estimation

Figure 25:
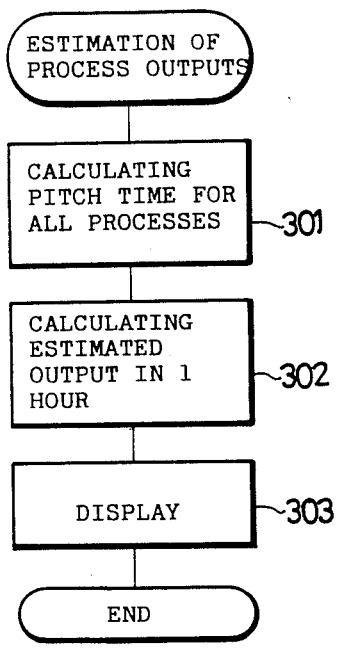
FIG. 25 is a flow chart generally showing processing for estimating process outputs.

Typical of processing for output estimation is that for process-wise estimation, by which the output to be obtained one hour later from each process is calculated and displayed for one product. FIG. 25 shows the outline of the processing procedure. For the specified product, the pitch time is calculated for each process with use of the basic data in the memory 122 (step 301). The pitch time is obtained by dividing output by actual work time. The output and actual work time to be used for this calculation are the data of the immediately preceding time zone. For example, for the output estimation to be made during 10:00 to 12:00, the output and actual work time during 10:00 time zone are used. For the estimation to be made during the period of 12:00 to 15:00, the output and actual work time of 12:00 time zone are used. The reason is that the work efficiency generally increases with time; it is higher in 12:00 time zone than in 10:00 time zone. It is higher in 15:00 time period and still higher in 16:45 time zone. No output estimation is done during the period of 8:15 to 10:00.

Next, for each process, one hour (60 minutes) is divided by the calculated pitch time to obtain an estimated output that would be obtained in one hour. The output sum to be obtained one hour later is calculated by adding the calculated estimated output to the output sum up to the current time concerned (step 302).

Figure 26:
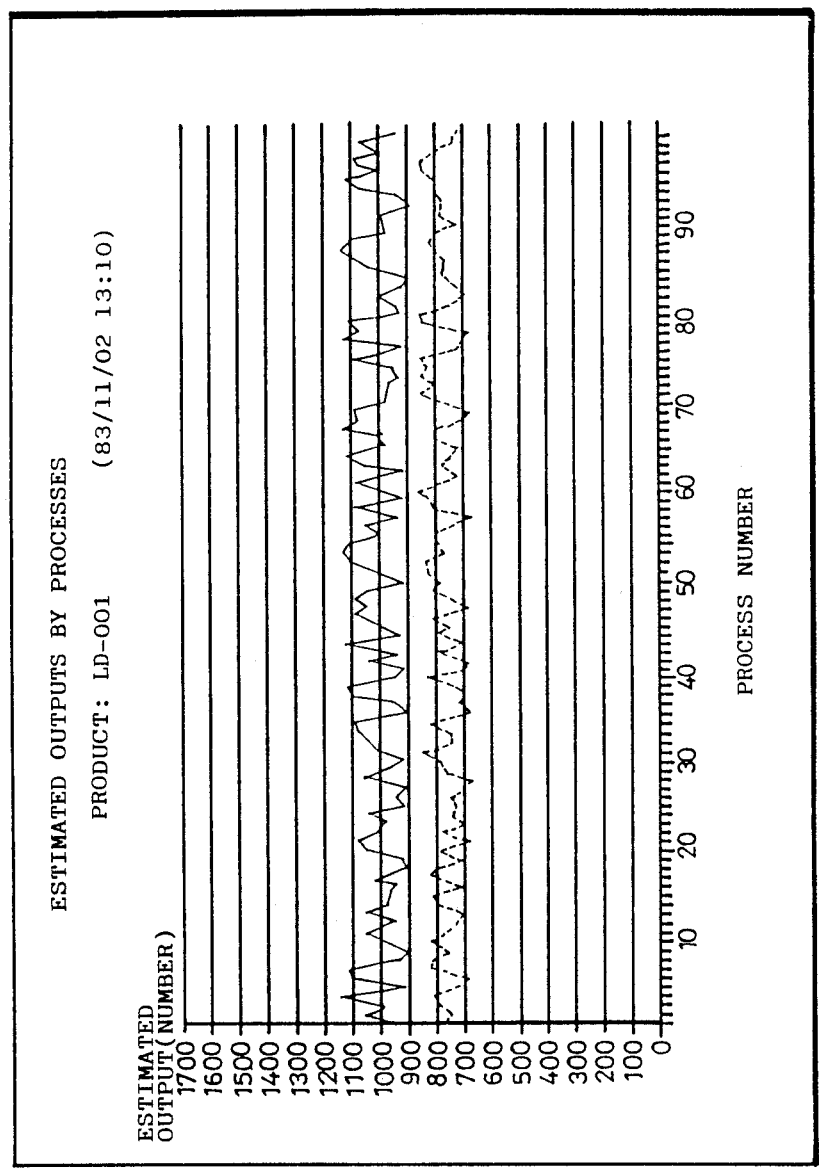
FIG. 26 shows an example of CRT image for displaying estimated process outputs.

FIG. 26 graphically shows the output sum achieved by the indicated time (broken line) and estimated output sum to be achieved in one hour for each process (indicated by process number). The data is shown on the CRT 124 in different colors (step 303). The display shows the operator the output sum to be obtained in one hour.

In addition to the mode of display shown in FIG. 26, product-, process- and worker-wise output estimations can be displayed in the same manner as in FIGS. 19, 21 and 22. The estimated output data can of course be printed out by the printer 125. The estimation processing shown in FIG. 25 is preferably performed as associated with the output display processing of FIG. 18. For example, the display of output by products (steps 271, 272 in FIG. 18) can be followed by product-wise output estimation, and the process-wise output display (FIG. 18, steps 273 to 275) can be followed by the processing of FIG. 25.

Output estimation is useful for production control in determining when to set processes for a new product to be made subsequent to the current product, or in judging whether the product to be delivered can be manufactured in time.

Processing for Line Balance Check

Figure 27:
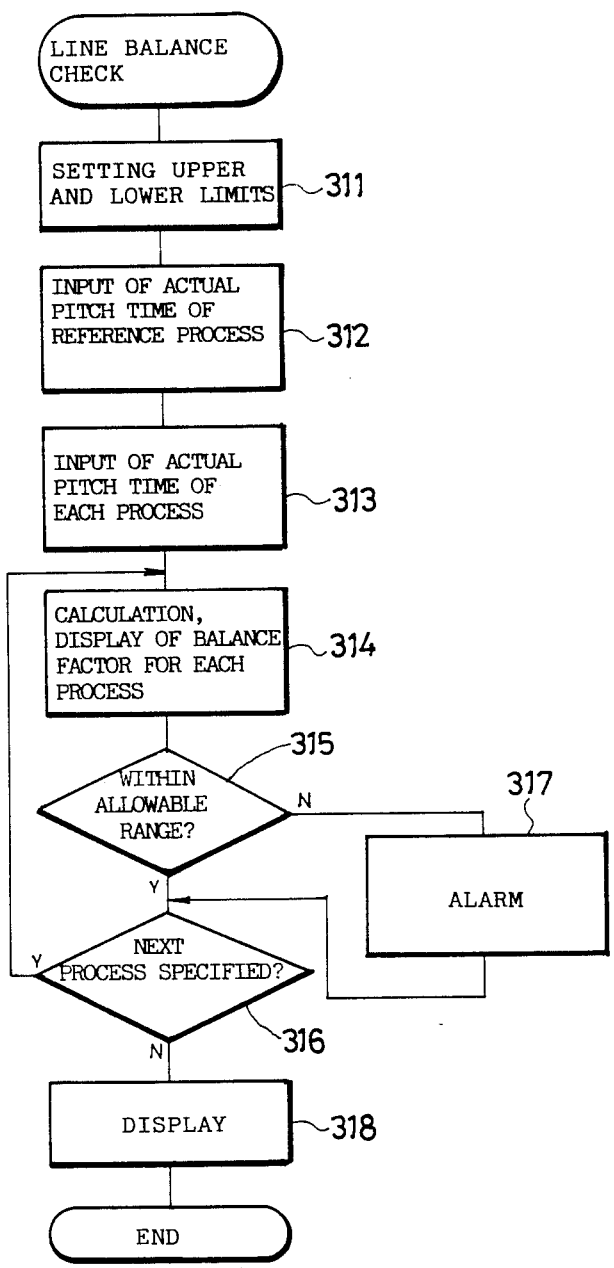
FIG. 27 is a flow chart generally showing line balance check processing.

FIG. 27 shows an exemplary procedure for line balance check, wherein all data is entered by the operator. First, allowable upper and lower limits for line balance are set (step 311). The upper and lower limit values are expressed, for example, as 80%–120%, or 0.9–1.1. The upper and lower limit values may be preset in the memory 122. Subsequently, the actual pitch time of the process is entered to be a reference for the product for which the line balance is to be checked (step 312). The actual pitch times of other processes for the same product are also entered (step 313). The reference process is a process which serves as a reference in checking the output balance between processes. While the final process (e.g., an ironing process) is generally used, any desired process is serviceable as the reference. The actual pitch time is measured by the operator as to all the processes or a required number of processes prior to the present processing. When the present procedure is to be performed for a plurality of products, the actual pitch time of processes for each product is entered. As to the method of pitch time data input, the data can be entered for all processes first, and the reference process thereafter specified.

With the required data thus entered, a balance factor is calculated for every process. The balance factor is obtained by dividing the output (theoretical) of a process during a specified period of time (e.g., one hour) by the output (reference output) of the reference output during the same period of time. For the sake of convenience, the balance factor is expressed as a percentage in the case of the present embodiment. The output during a given time period of processes, inclusive of the reference process, can be determined by dividing the time period by the input actual pitch time. Accordingly, the balance factor can also be calculated directly from the actual pitch time. When a process name is specified by the operator, the CRT 124 displays data such as the process name, the product name concerned, reference output, theoretical output, balance factor of the process and whether the factor is within the allowable range dependent on the upper and lower limits as seen in FIG. 28 (step 314). When the balance factor is in this range and further when the next process is specified, the same display as above is given for the next process (steps 315, 316). If the balance factor is not within the allowable range, the image screen of the CRT 124 changes entirely to an alarm color such as red or yellow, and the buzzer 125 goes on (step 317).

Figure 29:
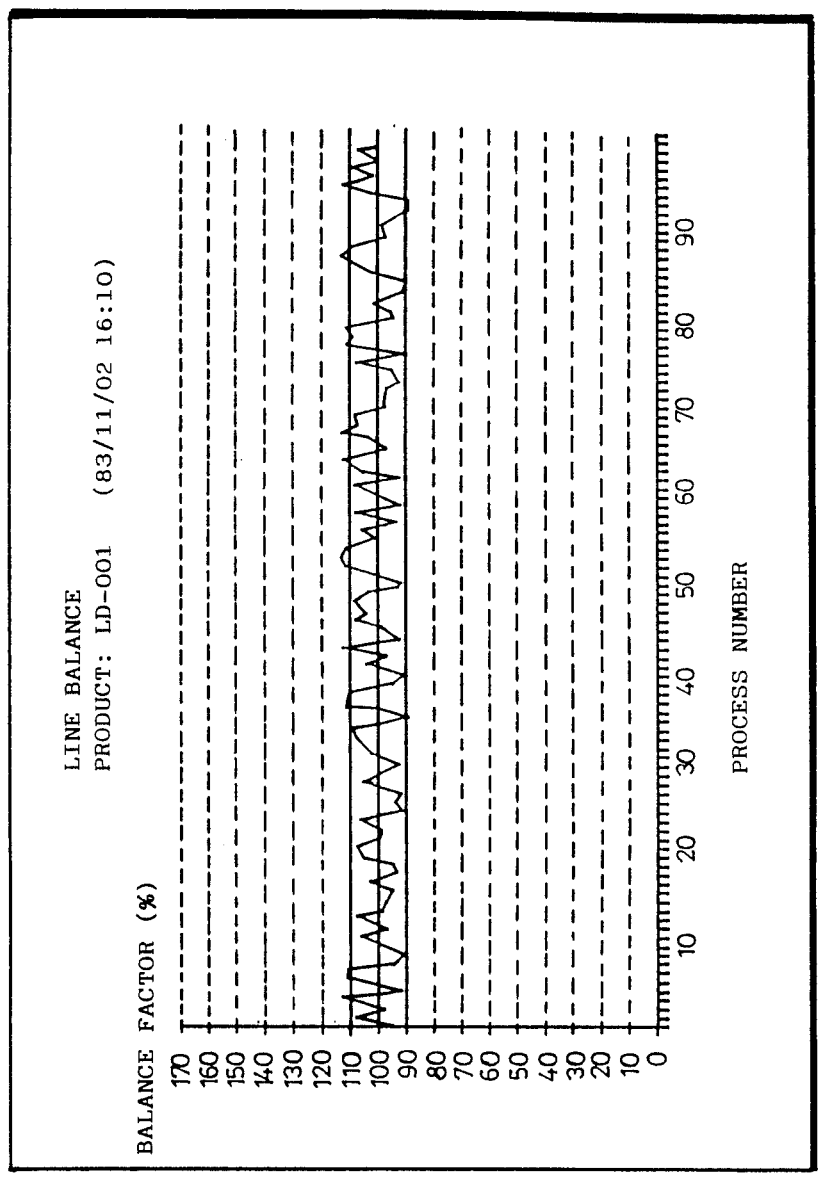

When displays are given for all processes for all products and a desired product name is then specified, the process-wise balance factors for the product are displayed on the CRT 124 as shown in FIG. 29. The graph shows the apparent balance of the overall process. The upper and lower limits are also shown. When required, the line balance data is printed out by the printer, 125.

The line balance check process can also be executed with use of the actual outputs, stored in a reference data area in the memory 122, instead of the actual pitch time. In this case, the output as the basis for determining the line balance factor can be the output of a desired time period, e.g., the output sum from 8:00 a.m, or the output of the time zone immediately preceding the check procedure, or the output during a given period of time (e.g. 1 hour or 30 minutes) immediately preceding the check procedure. The foregoing estimated output may also be used for determining estimated line balance.

The line balance check procedure may be performed at all times by the CPU 120 to automatically give an alarm when a process is found which is outside the allowable range of upper and lower limits.

It is possible to carry out the line balance check processing as associated with the foregoing processing for output display or estimation.

The output variation between processes, if smaller, results in a higher sewing efficiency. When there is a process which is exceedingly smaller or greater than the reference process in output, intentional adjustment must be made, for example, by changing the worker or using an increased number of work areas. The line balance check process reveals an output variation between processes, so that such adjustment can be accomplished easily.

Worker Daily Report Processing

Data as to the amount of work done by each worker for the day and data as to the evaluation thereof are prepared and given as an output. This procedure is performed generally upon completion of one day's work. FIG. 30 shows part of the worker daily report printed out by the printer 125. Printed on the report for each worker are the name(s) of the product(s) for which she worked on that day, the name(s) of process(es) concerned, the day's output of each process, the standard pitch time (min) of each process, standard work hour (min) and actual work hour (min), proficiency of the worker in each process (%), and total or average of such values. The actual work hour or time is the period of time which is the period from the start of work for the process to the end of work, minus recesses (predetermined as to the duration and time zone). The start and ending of work can be determined by reading the worker name card, process setting or the like. The standard work hour or time is the output multiplied by the standard pitch time. The proficiency is obtained by dividing the standard work time by actual work time. When the worker engaged in one process only during the day concerned, the proficiency for the process is the average of the proficiency on that day.

The worker daily report indicates the aptitude and proficiency of the worker for the work. Furthermore, the report serves as data for evaluating her service and provides basis for calculating wages when she works on a piece rate.

The average value of proficiency degree of each worker is stored along with the date in a worker totaling area of the memory 122 (see FIG. 31.) The proficiency data is used later for worker proficiency data processing. In place of the average proficiency value, the degree of proficiency for each process may be stored.

The data as to individual workers other than the proficiency data need not always be held stored in the memory 122 after printing by the printer 125. This saves the storage space within the memory.

Worker Proficiency Data Processing

Figure 32:
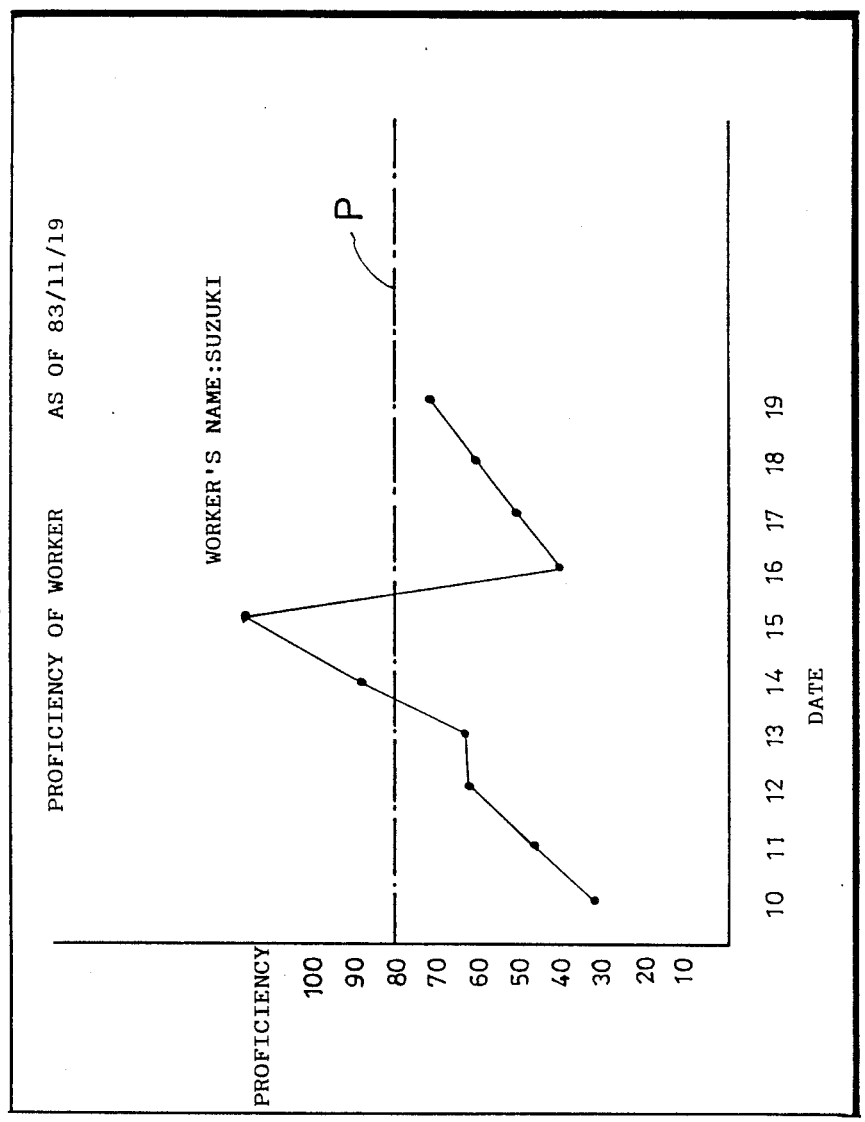
FIG. 32 shows an example of CRT image in worker proficiency output processing.

When, worker name is specified and an output instruction is given by the keyboard and light-pen, the proficiency data (average values) stored in the memory 122 as shown in FIG. 31 is displayed in the form of a graph on the CRT 124 as seen in FIG. 32. In the graph, the date is plotted as abscissa vs. the proficiency as ordinate. The graph readily indicates the proficiency of the worker. The CRT 124 also shows an acceptable proficiency line P. The proficiency data can be printed out by the printer in the form of a graph or table. When the proficiency data is stored for each process, like graphs can be displayed and printed, out for each process. The proficiency data is very useful for assigning suitable work to workers and work training or guidance.

Other Processing

Other processing includes the procedure of handling faulty products, the procedure of cost accounting, etc.

Identification of Abnormal Terminal Device

Since the central device 40 and all terminal devices are connected together by communication channels in the form of a loop, a malfunction developing in one terminal influences the other terminals to possibly result in a failure of the system. With the present communication system, when one terminal device has failed, the other terminal devices are still capable of communicating with the central device. However, it is not desirable to leave the faulty terminal as it is. If a terminal fails while performing a specified operation such as counting of output at the work area, it becomes impossible to collect the data as to that work area, with the result that the data prepared by the foregoing output processing line balance processing, etc., will not be perfect. The abnormal terminal identifying processing detects faulty terminals promptly and takes corrective measures.

Figure 33:
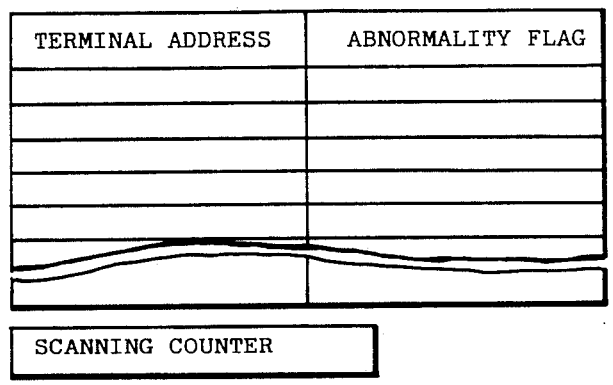
FIG. 33 shows an abnormal terminal table provided within the memory of the central device.

FIG. 33 shows part of the communication area provided within the memory 122 of the central device 40, namely an abnormal terminal table. The table has an abnormality flag in corresponding relation to the terminal address (or other suitable identification symbol) of each terminal. The communication area includes a location which is used as a scanning counter.

Figure 34:
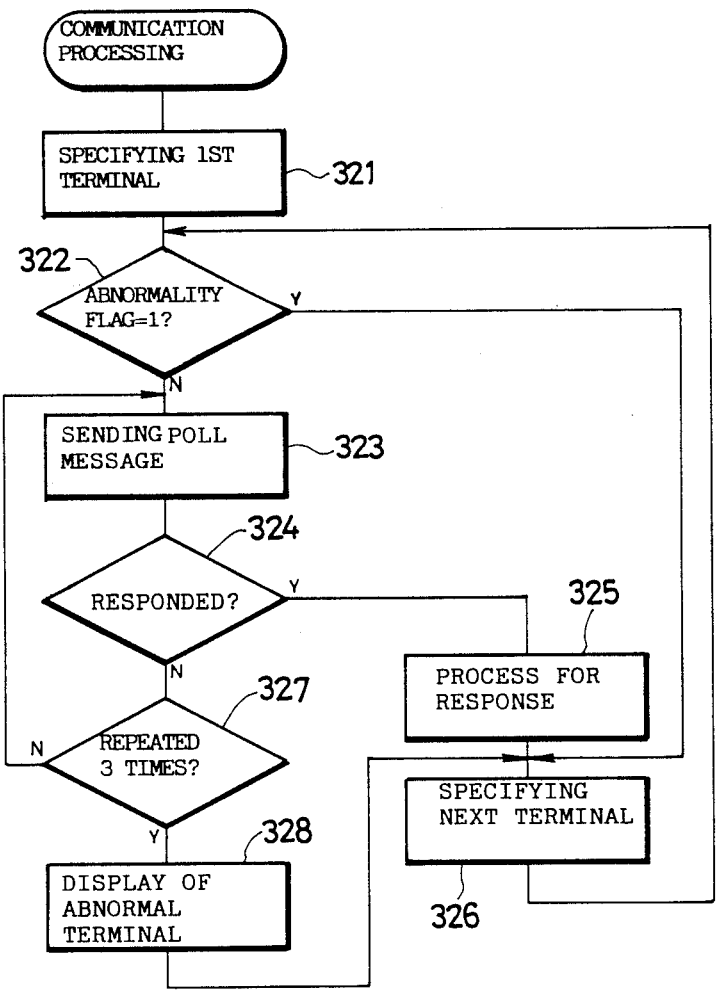
FIG. 34 is a flow chart generally showing the communication process to be executed by the central device with the terminal device.

FIG. 34 shows the communication process to be executed by the host CPU 120 of the central device 40 with terminal devices. The process is performed for the communication test before the start of operation shown in FIG. 14 (step 232), for communication to confirm process name, etc. (steps 235, 236) and for the usual communication (steps 237, 238). First, numerical data, e.g., terminal address, is set on the scanning counter for specifying the first terminal device (step 321). Next, the abnormal terminal table is searched to check whether the abnormality flag for the terminal concerned is set (step 322). The flag, if set, indicates that the device is abnormal. If otherwise, a poll message (or select message) is sent to the terminal to wait for a response (step 323). When some response is received from the terminal concerned without any error (step 324), the response message is processed (step 325), e.g. data check, modification, storage, etc. (FIG. 14, steps 236, 238). On completion of this process, the scanning counter is advanced by 1, and the terminal address of the terminal device with which communication is to be made next is set on the counter (step 326), which is followed by step 322 again. The same procedure is repeated in succession. If there is no response from the terminal to which a poll message was given, even upon lapse of a predetermined period of time, or if the response received has some error (NO to the inquiry of step 324), a poll message is transmitted again. If some fault still remains even when polling is repeated three times for the same terminal (YES to step 327), the address, number or the like of the abnormal terminal and an incidence of abnormality are displayed on a portion of the CRT 124 (step 328). At this time, the buzzer 126 may be turned on. The address of the abnormal terminal is temporarily stored in a suitable area of the memory. At this time, the abnormality flag may be set for the faulty terminal, but with the present embodiment, the flag is adapted to be set by the treatment to be described later for error terminals. Step 326 thereafter follows for the communication with the next terminal.

If an abnormality flag is in set position (YES to the inquiry of step 322), no communication process is done for the terminal concerned but communication with the next terminal immediately follows. Thus, no communication is made with the terminal for which the flag is set, so that improved communication efficiency can be achieved by eliminating the useless procedure of communicating with the faulty terminal from which no response whatever would be obtained.

When information as to an abnormal terminal is displayed on the CRT 124, the operator takes countermeasures by repairing the terminal device, removing the terminal from the communication channels (and interconnecting the channels A and B connected to the terminal), or replacing the faulty terminal by a new one. The faulty one may be allowed to stand as it is.

Figure 35:
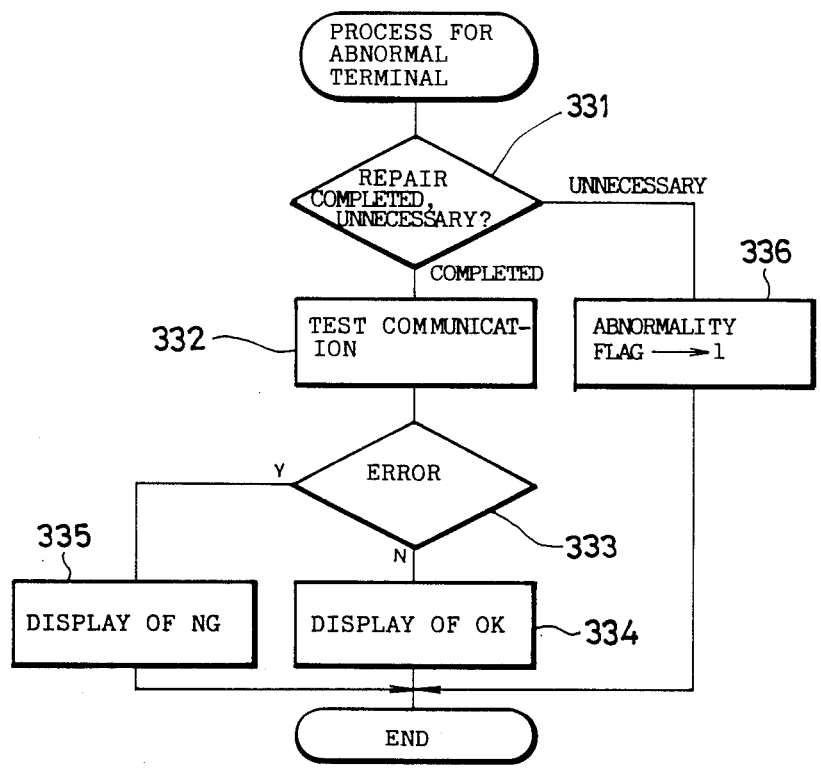
FIG. 35 is a flow chart generally showing processing for an abnormal terminal device.

FIG. 35 shows the procedure to be thereafter followed by the operator. After the abnormal terminal device has been repaired or replaced by a new terminal, the address or number of the terminal and completion of repair is entered by the operator with the keyboard 123 or the like (step 331), whereupon test communication is performed for the terminal device (step 332). When normal communication is performed, an OK signal is displayed on the CRT 124 (step 334). If the faulty terminal is replaced by a new one, the basic data relating to the work area concerned will be sent to the new terminal from the central device 40. If some error still remains despite repetition of communication test three times (YES to step 333), the CRT 124 gives the same abnormality display as in the foregoing step 328 (step 335). At this time the abnormality flag may be set.

When the operator has decided to remove the abnormal terminal device from the communication channels or to allow it as it is, "no need of repair" is entered by the operator (step 331), whereupon the abnormality flag for the terminal is set (step 336), and the terminal is removed from the communication routine as stated already. In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. A production process control system, to control work being performed by a plurality of workers on a succession of articles moved by carriers of a conveyor line to work machines located in a plurality of work areas, comprising:

a plurality of sensors, with one of said sensors being located at each of said work areas, said sensors being operable for detecting articles that have been worked on at the corresponding work areas, as said articles are transported to the next successive work areas, and for generating corresponding detection signals;

a plurality of terminal devices with a terminal device located at each of said work areas, each of the terminal devices comprising means for determining a work output at a work area based on a detection signal sent from a corresponding sensor located thereat, means for entering a worker identifying code by the worker producing said work output, and means for transmitting data related to said work output and the corresponding worker identifying code; and a central device comprising means for performing communications with each of said terminal devices, said central device also comprising means for storing at least said data related to said work output and the worker identifying code transmitted from the terminal devices.

2. A system according to claim 1, wherein:
the terminal devices are respectively provided at individual work areas in corresponding relation to stations of a conveyor branch line branching off a main portion of the conveyor line, for collecting data relating to at least the work output of the corresponding work areas, each sensor comprises an output counting switch connected to each corresponding terminal device, and the output counting switch is actuated by one of a carrier returning from the station to the main line and an article transported by the carrier.

3. A system according to claim 2, wherein:
the branch line comprises transport means for forwarding an article from a station of the branch line to the main line after temporarily stopping the article at least at one location between the position of the station and the main line, and the output counting switch is disposed at a location toward the main line from the temporary stopping position most proximate to the position of the station.

4. A system according to claim 1, wherein:
the central device comprises first means for preparing data related to an actual output of at least one process, second means for preparing data related to a reference output of a corresponding reference process, means for entering upper and lower limit values for a balance factor related to said outputs from said first and second means, means for calculating the balance factor by dividing the data as to the actual output prepared by the first preparing means by the data as to the reference output prepared by the second preparing means, and a display unit for displaying the balance factor calculated by the calculating means and the relationship of the balance factor with the upper and lower limit values entered by the entering means.

5. A system according to claim 4, wherein:
the reference process is the final production process for a product.

6. A system according to claim 4, further comprising:
means for notifying a system operator that the balance factor calculated by the calculating means is outside the range of the upper and lower limit values.

7. A system according to claim 4, wherein:
the balance factors for a plurality of processes are displayed on the display unit.

8. A system according to claim 4, wherein:
the first preparing means and second preparing means are also means for entering a pitch time representing the time which is required for work assigned to the corresponding process.

9. A system according to claim 4, wherein:
the first preparing means and second preparing means are also means for collecting output data relating to each product production process.

10. A system according to claim 1, wherein:
the central device further comprises means for measuring the output and an actual work time of a worker for each process that a worker has engaged in, means for calculating the degree of proficiency of the worker for each process the worker has engaged in from the output and actual work time of the worker measured by the measuring means and from predetermined standard work efficiency data, and means for giving a worker daily report output containing data related to the output and actual work time measured by the measuring means and the degree of proficiency calculated by the calculating means for each process on the day concerned.

11. A system according to claim 10, further comprising means for calculating the average value of proficiency degrees for a plurality of processes and providing the same as an output.

12. A system according to claim 1, wherein
the central device further comprises means for measuring the output and an actual work time of a worker for each process that a worker has engaged in,
means for calculating the degree of proficiency of the worker for each process the worker has engaged in from the output and actual work time of the worker measured by the measuring means and from predetermined standard work efficiency data, means for storing data related to the degree of proficiency calculated by the calculating means for each date concerned, and means for providing a data output related to the stored degree of proficiency for each date as stored in the storing means.

13. A system according to claim 12, wherein:
the data output is the degree of proficiency for each process.

14. A system according to claim 12, wherein:
the data output is the average of degrees of proficiency calculated for each day.

15. A system according to claim 12, wherein:
the output providing means comprises a display unit, and the data related to the degree of proficiency is graphically displayed thereby with respect to the date.

16. A system according to claim I, wherein:
the central device further comprises output collecting means for obtaining output data of each of the production processes for at least one product, means for storing the output data collected by the collecting means, and a display unit, connected to the storing means, for displaying information related to an output based on the output data stored in the storing means.

17. A system according to claim 16, wherein:
the output of said one product as classified by the corresponding production processes is graphically displayed on the display unit.

18. A system according to claim 16, wherein:
output data of each of the protection processes for a plurality of products is collected and stored in said storing means, and the output of the final process for each product is graphically displayed on the display unit as the output of each product.

19. A system according to claim 16, wherein:
the output data of each process is collected and stored for each of the workers engaged in the process, and the display unit displays the output of each of the workers for one process.

20. A system according to claim 1, wherein:
said communications means comprises means for transmitting said data via optical signals to avoid errors due to the influence of ambient electromagnetic fields that would tend to distort electrical transmissions of said data.

21. A system according to claim 1, further comprising:
a second terminal device, located at a work area other than said work area provided in corresponding relation to stations of said conveyor line, said second terminal device comprising means for inputting a number of articles that have been worked on at the corresponding work area and for generating a signal representing the number of articles worked on, means for determining a work output based on the signal generated from said input means, means for entering a worker identifying code by the worker producing said work output, and means for transmitting data related to said work output and the corresponding worker identifying code.

22. A production process control system, to control work being performed by a plurality of workers on a succession of articles with work machines located in a plurality of work areas, comprising:
a plurality of sensors, with one of said sensors being located at each of said work areas, said sensors being operable for detecting articles that have been worked on at the corresponding work areas, as said articles are transported to the next successive work areas, and for generating corresponding detection signals;
a plurality of terminal devices with a terminal device located at each of said work areas, each of the terminal devices comprising a means for determining a work output at a work area based on a detection signal sent from a corresponding sensor located thereat, means for entering a worker identifying code by the worker producing said work output, and means for transmitting data related to said work output and the corresponding worker identifying code; and
a central device comprising means for performing communications with each of said terminal devices, means for storing at least said data related to said work output and the worker identifying code transmitted from the terminal devices, and means for setting a process identifying code in the storing means as associated with any of said terminal devices located at various of said work areas, wherein the storing means stores the work output and the worker identifying code transmitted from said terminal devices, as associated with any of a set process indentifying code, a work area and a terminal device.

23. A system according to claim 22, wherein:
each of said terminal devices further comprises means for inputting a process indentifying code and means for checking whether said process indentifying code input by said input means matches with said process indentifying code set by said central device.

24. A system according to claim 22, wherein:
each of said terminal devices has means for inputting a process identifying code and means for transmitting data related to said process identifying code input by said input means, and said central device has means for checking whether said process identifying code transmitted from said terminal device matches with said process identifying code set by said central device.

25. A production process control system, to control work being performed by a plurality of workers on a succession of articles with work machines located in a plurality of work areas, comprising:
a plurality of sensors, with one of said sensors being located a each of said work areas, said sensors being operable for detecting articles that have been worked on at the corresponding work areas, as said articles are transported to the next successive work areas, and for generating corresponding detection signals;
a plurality of terminal devices with a terminal device located at each of said work areas, each of the terminal devices comprising a means for determining a work output at a work area based on a detection signal sent from a corresponding sensor located thereat, means for entering a worker identifying code by the worker producing said work output, and means for transmitting data related to said work output and the corresponding worker identifying code;
a central device comprising means for performing communications with each of said terminal devices, means for storing at least said data related to said work output and the worker indentifying code transmitted from the terminal devices; and
first means for calculating an estimated actual output and an estimated reference output a specified period of time later, second means for calculating an estimated balance factor to be expected upon the lapse of the specified time period from the estimated output values calculated by the first means, the display unit displaying the estimated balance factor calculated by the second means.

26. A production process control system, to control work being performed by a plurality of workers on a succession of articles with work machines located in a plurality of work areas, comprising:
a plurality of sensors, with one of said sensors being located at each of said work areas, said sensors being operable for detecting articles that have been worked on at the corresponding work areas, as said articles are transported to the next successive work areas, and for generating corresponding detection signals;
a plurality of terminal devices with a terminal device located at each of said work areas, each of the terminal devices comprising a means for determining a work output at a work area based on a detection signal sent from a corresponding sensor located thereat, means for entering a worker identifying code by the worker producing said work output, and means for transmitting data related to said work output and the corresponding worker identifying code;
a central device comprising means for performing communications with each of said terminal devices, means for storing a least said data related to said work output and the worker identifying code transmitted from the terminal devices; and
the central device further comprises output collecting means for obtaining output data of each of the production processes for at least one product, means for storing the output data collected by the collecting means, means for calculating an estimated output at a time when a specified period of time has elapsed for each process with use of the output data stored in the storing means, and a display unit for displaying information related to the estimated output calculated by the calculating means.

27. A system according to claim 26, wherein: the display unit displays the estimated output of each process for one product.

28. A system according to claim 26, wherein:
the stored output of each process and the calculated estimated output of each process are displayed on the display unit at the same time.

29. A system according to claim 26, wherein:
output data of each of production processes for a plurality of products is collected and stored, and the estimated output of the final process for each product is displayed on the display unit as an estimated output of each product.

30. A terminal device connected to a central device for control thereby of a production process, in which a plurality of workers perform work with machines on a series of workpieces in various steps of the process, comprising:
input means for inputting to said terminal device a signal relating to a work output;
means for enabling communication between the terminal device and the central device;
a bar code reader for reading at least worker identification data recorded in the form of a bar code;
a bar code reader withdrawal detecting switch mounted on a holder for holding the bar code reader; and
control means for controlling a work machine and performing at least an output computing process based on the input signal relating to the work output from the input means and for causing the communication performing means to transmit at least the computed output data to the central device, the control means performing a process for reading bar code data given by the bar code reader and feeding a power supply off signal to said work machine in response to a bar code reader withdrawal detecting input from the bar code reader withdrawal detecting switch.

31. A terminal device according to claim 30, further comprising:
a bar code input allowable display means which is activated in response to the bar code reader withdrawal detecting input from the bar code reader withdrawal detecting switch.

32. A terminal device according to claim 30, wherein:
the bar code reader enables entry of worker identifying codes.

33. A terminal device according to claim 30, wherein:
the bar code reader enables entry of set process identifying codes.

34. A terminal device according to claim 30, wherein:
said transmitting means comprises means for transmitting said data via optical signals to avoid errors due to the influence of ambient electromagnetic fields that would tend to distort electrical transmissions of said data.

* * * * *